INVENTOR.
DAVID W. STONE
BY James E. Nilles
Daniel D. Petterley
ATTORNEYS

Aug. 27, 1968   D. W. STONE   3,399,337
ELECTRICAL CONTROL CIRCUIT FOR CONVERTING ALTERNATING
CURRENT TO ADJUSTABLE MAGNITUDE DIRECT CURRENT
Filed Nov. 10, 1966   7 Sheets-Sheet 3

INVENTOR.
DAVID W. STONE
BY James E. Nilles
Daniel D. Fetterley
ATTORNEYS

INVENTOR.
DAVID W. STONE

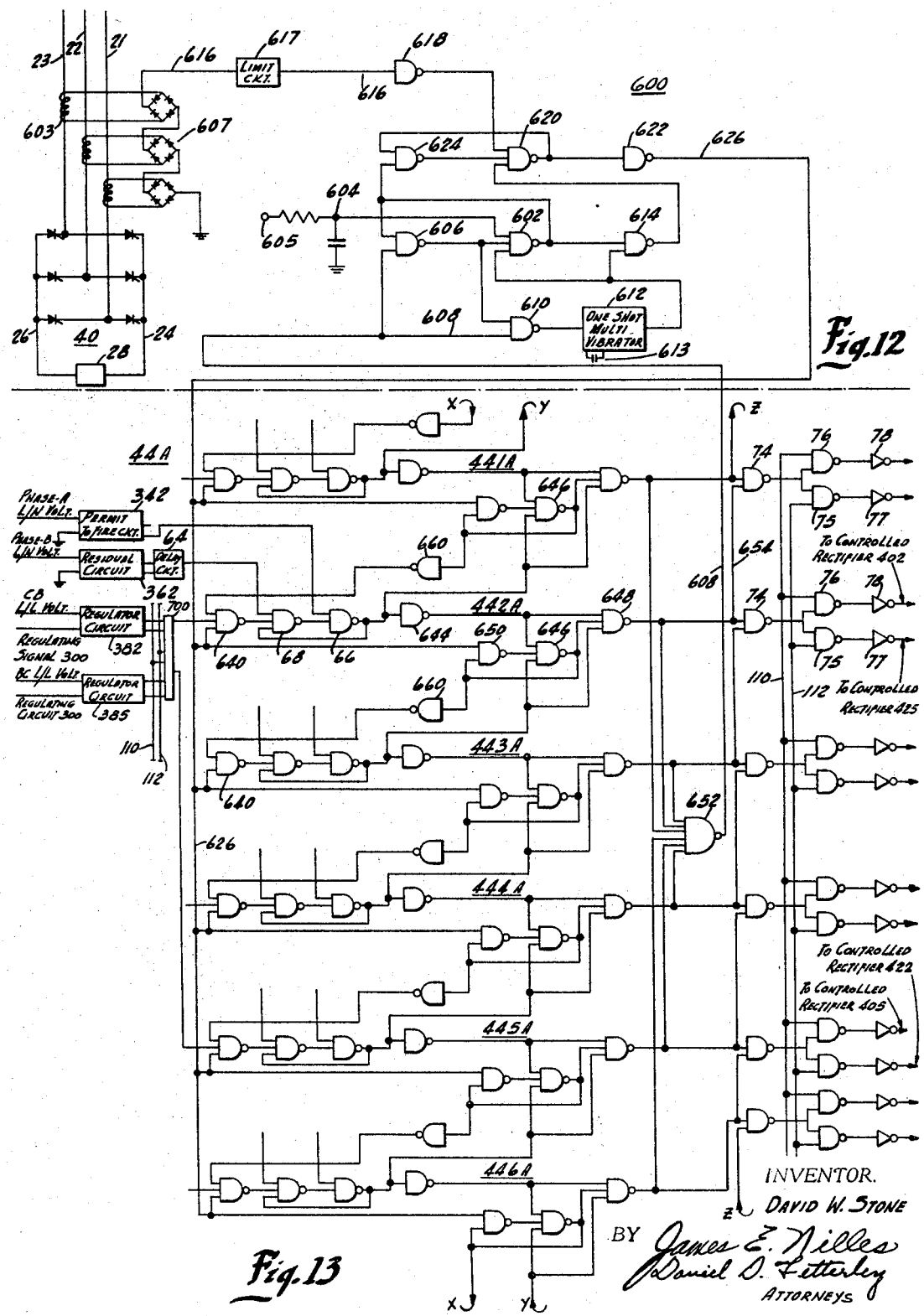

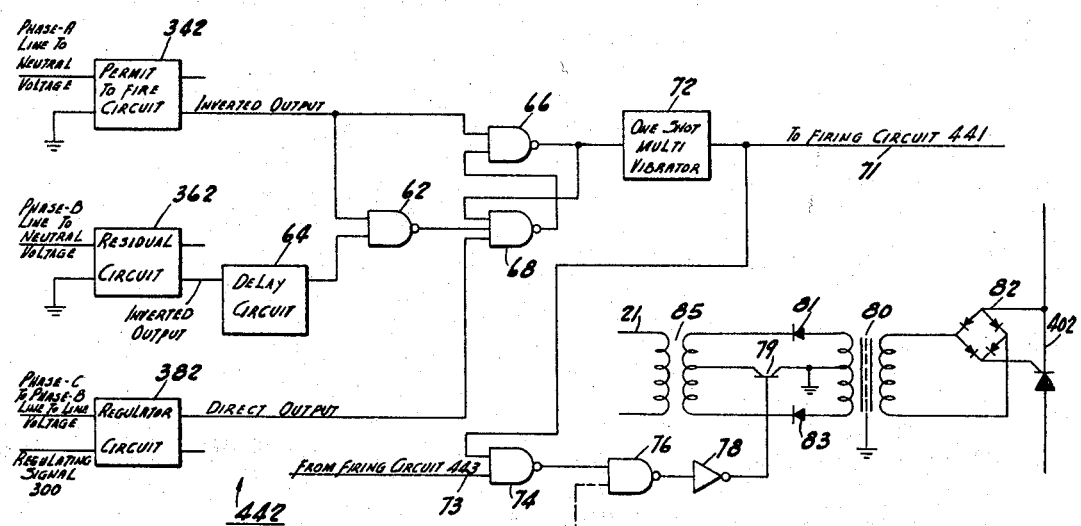
Fig. 5
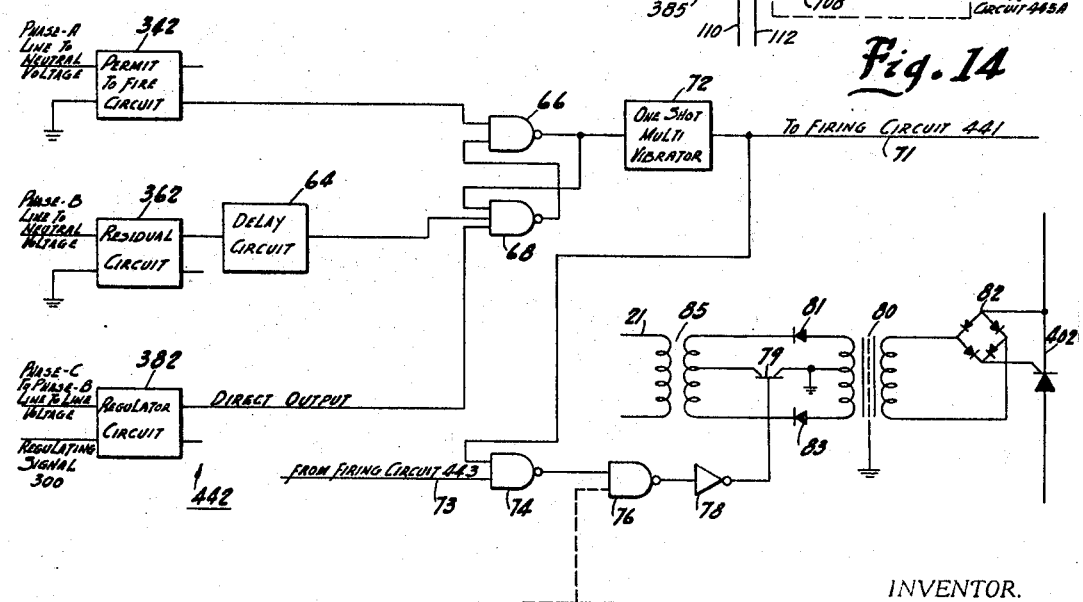
Fig. 14
Fig. 7
INVENTOR.
DAVID W. STONE
BY James E. Nilles
Daniel D. Fetterley
ATTORNEYS United States Patent Office 3,399,337
Patented Aug. 27, 1968

3,399,337
ELECTRICAL CONTROL CIRCUIT FOR CONVERTING ALTERNATING CURRENT TO ADJUSTABLE MAGNITUDE DIRECT CURRENT
David W. Stone, Franklin, Wis., assignor to Harnischfeger Corporation, Milwaukee, Wis., a corporation of Wisconsin
Filed Nov. 10, 1966, Ser. No. 593,561
57 Claims. (Cl. 321—5)

ABSTRACT OF THE DISCLOSURE

An electrical control circuit for converting poylphase alternating current to adjustable magnitude direct current by controlling a rectifier bridge including a plurality of firing circuits for rendering the controlled rectifiers in the bridge conductive. A plurality of permit to fire circuits are connected to the firing circuits to permit each of the firing circuits to fire the controlled rectifiers after a first point in time in the rectifier conductive interval. Regulator circuits operate the firing circuits to provide firing signals in accordance with a regulating signal. Residual circuits force the firing circuits to fire the controlled rectifiers if the regulator circuits have not previously done so.

---

The present invention relates to an electrical control circuit for converting alternating current to adjustable magnitude direct current.

Introduction

Control circuits of this general type provide alternating current to direct current conversion by means of unidirectional conduction devices, such as rectifiers, which change the bidirectional alternating current in the alternating current supply lines to unidirectional direct current. The magnitude of the direct current may be adjusted in accordance with an input signal by employing unidirectional conduction devices having a controllable conduction interval responsive to the input signal. These devices are termed generically thyristors. The most commonly available thyristor is the silicon controlled rectifier, often designated simply SCR. For this reason, the present invention is described as employing silicon controlled rectifiers. However, it is to be understood that other types of thyristors may be employed therein.

Development of inexpensive, high amperage, solid state controlled rectifiers, such as the silicon controlled rectifier, to replace the previously utilized gaseous vapor tubes of the thyratron, ignitron, and mercury vapor type has greatly increased the feasibility and use of conversion controls. However, controls heretofore developed and made commercially available have suffered several failings. One such failing has been the poor operational characteristic of the control in responding to changes in the input signal. Prior art controls often required a considerable period of time to adjust the magnitude of the direct current output in response to changes in the input signal. This time period prevented close and accurate regulation of the output of the control circuit.

The poor response times of these controls was due mainly to the inclusion of a timing circuit to determine the initiation of the controllable conduction interval of the controlled rectifiers. These timing circuits included capacitors or saturable reactors which were energized in accordance with the input signal. When the desired amount of charge or saturation was obtained, a unijunction transistor or magnetic amplifier connected thereto rendered the controlled rectifiers conductive. The integration function performed by the timing circuit caused the poor response of the control circuit.

In addition to the poor response characteristics, the operation of prior art control circuits was often effected by changes in the line voltage which caused the control to drift or to become otherwise unstable. This was the result of the use of line voltage as a controlling signal in the control circuit so that changes in the line voltage caused changes in the operation of the control circuit. Changes in the line frequency also caused changes in the operation of the control circuit.

It is, therefore, a salient object of the present invention to provide an electrical control circuit of the type described which instantly responds to changes in the input signal to adjust the magnitude of the direct current output, thereby permitting extremely accurate regulation of the output of the control.

It is a further object of the present invention to provide an electrical control circuit of the type described that provides such instantaneous response to changes in the input signal by means of logic elements so as to eliminate the capacitors or saturable reactors formerly employed in such controls.

It is a further object of the present invention to provide an electrical control circuit of the type described, which is insensitive to changes in the line voltage and frequency during its operation.

Still another object of the present invention is to provide an electrical control circuit for converting alternating current to an adjustable magnitude direct current output wherein the firing of the controlled rectifiers is determined by comparing a regulating signal with a signal proportional to the instantaneous line to line voltages to provide stability and to cause load drift characteristics to be controlled.

Controlled rectifiers

While the advent of solid state controlled rectifiers has rendered more feasible the utilization of alternating current to direct current conversion controls, it has also increased the necessity, in circuitry utilizing such elements, for proper control of the rectifiers to render satisfactory operation to the equipment, to preserve and extend the service life of the controlled rectifiers, and to prevent destructive misfires of the rectifiers and short circuits in the equipment.

The external connections of a controlled rectifier, for example, an SCR, include a cathode, an anode, and a gate terminal. When the SCR is biased so that the cathode is negative and the anode is positive, or so that the anode is more positive than the cathode, the SCR is in a potentially conductive state. When the SCR is biased so that the cathode is positive and the anode is negative, or so that the anode is more negative than the cathode, the SCR will block the flow or conduction of current under all circumstances.

When the SCR is potentially conductive, that is, when the cathode is negative and the anode is positive, the SCR may be made to conduct current by providing a proper electric signal to the gate terminal. Upon application of this signal, the SCR will be rendered conductive or will "fire" and current conduction will begin.

Once the SCR has begun conduction, the gate signal may be removed from the gate terminal as it loses control of the operation of the SCR. The SCR will continue to conduct until the voltage applied to its anode and cathode falls below the forward voltage drop of the SCR or until the voltage applied to its anode and cathode is reversed so as to bias the SCR into the nonconducting state.

When a SCR is connected in series with an alternating current supply line, and a passive load, it is, of course, subjected to voltages of both polarities during each cycle of alternating current. For half of the cycle it is biased so that its cathode is negative and its anode is positive. Under these conditions, the SCR is potentially conductive and will conduct current if the appropriate signal is applied to its gate.

For the other half cycle, the SCR is biased so that its cathode is positive and its anode is negative. Under these conditions the SCR cannot be made to conduct even if a gate signal is applied. Thus, the SCR is potentially conductive only one half of each complete cycle of the alternating current and the maximum direct current power that may be generated, assuming the SCR conducts for the entire interval during which it is properly biased, is one half of the alternating current power available. Such operation of the SCR is termed half wave rectification.

Less than the maximum amount of direct current may be generated by controlling the application of the signal applied to the gate terminal so that the SCR conducts for less than the entire interval during which it is properly biased for conduction. The point in time during the conductive interval at which the firing signal is applied to the gate terminal of the controlled rectifier is generally defined in terms of electrical degrees and specifically as a "firing angle" of a certain number of electrical degrees. Advancing the firing angle increases the amount of direct current conducted by the SCR while retarding the firing angle reduces the amount of direct current conducted.

The application of the firing signal to the SCR at the desired firing angle has, in the past, been controlled by the aforementioned timing circuit in the conversion control.

Rectifier bridges

The obvious limitations and inefficiencies of half wave rectification as described above, has led to the use of full wave rectification which utilizes both half cycles of the alternating current. To obtain such rectification, four controlled rectifiers are connected in the familiar diamond or bridge configuration. The alternating current supply lines are connected to two opposite corners of the bridge while the direct current buses are connected to the other two opposite corners. One of the direct current buses supplies rectified current to the load and may be termed the positive direct current bus. The other direct current bus returns the direct current power from the load to the alternating current supply line and may be termed the negative direct current bus. Each leg of the bridge has a controlled rectifier connected therein. The controlled rectifiers in the legs of the bridge connected to the positive bus have their cathodes connected to the positive bus and their anodes connected to the alternating current supply lines. The controlled rectifiers in the legs of the bridge connected to the negative direct current bus have their anodes connected to the negative bus and their cathodes connected to the alternating current supply lines.

During one half cycle of the alternating current in the alternating current supply lines, one of the controlled rectifiers having its cathode connected to the positive direct current bus will conduct positive alternating current from the supply line containing such positive alternating current to the positive direct current bus. The other controlled rectifier having its cathode connected to the positive direct current bus will be reversed biased by the negative alternating current voltage contained in the other alternating current supply line. One of the controlled rectifiers having its anode connected to the negative direct current bus will return current from the negative bus to the alternating current supply line containing the negative alternating current voltage. The other controlled rectifier having its anode connected to the negative direct current bus will be reversed biased by the positive alternating current voltage appearing in the supply line containing such voltage.

For the other half cycle of alternating current, the other of the controlled rectifiers having its cathode connected to the positive direct current bus will conduct positive alternating current from the supply line to the positive direct current bus. The other of the controlled rectifiers having its anode connected to the negative direct current bus will return current from the negative direct current bus to the alternating current supply line containing the negative alternating voltage. The remaining controlled rectifiers in the bridge will be reversed biased by the voltage applied to them by the alternating current supply lines.

In this manner direct current of the same polarity is supplied to direct current buses during both half cycles of the alternating current. This permits the magnitude of the direct current supplied to direct current buses to approach the magnitude of the alternating current supplied to the rectifier bridge by the alternating current supply lines. The portion of the total alternating current supply which is actually transmitted to the direct current buses is determined by the proportionate time intervals during which the controlled rectifiers in the bridge conduct, as previouly described in connection with half wave rectification.

Rectifier bridges—multiphase

A rectifier bridge may also be employed to convert multiphase alternating current, as well as the previously described single phase alternating current to direct current. Such a rectifier bridge is shown in FIGURE 1 and is designated by the numeral 40. For the three phase alternating current supplied by alternating current supply lines 21, 22 and 23, six rectifiers, 401 through 406, are required. Each controlled rectifier may have associated with it the appropriate and necessary fusing and $di/dt$ and $dv/dt$ protection in the manner well known to the art. Three of these rectifiers, 402, 404 and 406, have their cathodes connected to the positive direct current bus 24. The anodes of these rectifiers are connected to alternating current supply lines 22, 23 and 21, respectively. These supply lines contain the phase B, C and A voltages of the three phase alternating current. Rectifiers 401, 403 and 405 all have their anodes connected to the negative direct current bus 26. The cathodes of these rectifiers are connected to alternating current supply lines 23, 21 and 22, respectively. The above described connection of rectifier bridge 40 is shown in tabular form in the first table of the specifications, infra.

If the alternating current power supply contains additional phases, two additional rectifiers are required in rectifier bridge 40 for each phase. One of the two rectifiers connects the alternating current supply line to the positive direct current bus 24 while the other rectifier connects the negative direct current bus 26 to the alternating current supply line.

In operation, rectifier bridge 40 has three alternating current waves applied to it, one in each of the phases in alternating current supply lines 21, 22 and 23. In accordance with standard electrical practice, the alternatnig current waves are 120 electrical degrees apart. That is, 120 degrees after the phase A line to neutral voltage in alternating current supply lines 21 attains its maximum value, the phase B line to neutral voltage in alternating current supply line 22 attains its maximum value. 120 degrees after this, the phase C line to neutral voltage in alternating current supply line 23 attains its maximum value and so on. The relationship between the line to neutral voltages in alternating current supply lines 21, 22 and 23 is shown graphically in FIGURE 2.

Assuming that controlled rectifiers 401 through 406 are free to conduct anytime they are properly biased, at any given instant, current will be conducted to direct current bus 24 through the rectifier connected between the most positive phase of the alternating current power supply at that instant and the positive direct current bus 24. The current so conducted passes through the electrical load 28 of the bridge to negative direct current bus 26. The current is conducted from the negative direct current bus 26 back to the alternating current supply lines through the rectifier connected between negative direct current bus 26 and the most negative phase of the alternating current power supply.

For example, at time $T_1$, in FIGURE 2, the phase B line to neutral voltage in alternating current supply line 22 is the most positive voltage appearing in any of the alternating current supply lines sinue at this point both the phase A line to neutral voltage and the phase C line to neutral voltage are negative. Alternating current from supply line 22 will thus pass from the supply line through rectifier 402, connected between supply line 22 and the positive direct current bus 24, to positive direct current bus 24 and the load 28. It may be noted that at this point, that when the positive voltage from alternating current supply line 22 is supplied to positive direct current bus 24, the voltage on the cathodes of rectifiers 404 and 406 will be this voltage since the cathodes of controlled rectifiers 404, 402 and 406 are all tied together by positive direct current bus 24. The voltage on the cathodes of controlled rectifiers 404 and 406 will thus be more positive than the voltage applied to the anodes of these rectifiers by the phase C line to neutral voltage in supply line 23 and the phase A line to neutral voltage in line 21, respectively, and will bias controlled rectifiers 404 and 406 into the nonconductive state and prevent the conduction of current through them.

Also at time $T_1$, the phase C line to neutral voltage in alternating current supply line 23 is the most negative of any of the supply voltages existing in the alternating current supply lines. This causes the current supplied to positive direct current bus 24 and load 28 by controlled rectifier 402 to return to the alternating current power supply from negative direct current bus 26 through controlled rectifier 401 and alternating current supply line 23. The above described current path remains operative for as long as the phase B line to neutral voltage is the most positive voltage in the power supply and the phase C line to neutral voltage is the most negative voltage.

At time $T_{C1}$, however, the phase A line to neutral voltage in alternating current supply line 21 becomes the most negative in the power supply. This causes the path of the return current flow from negative direct current bus 26 to the alternating current power supply to be shifted from controlled rectifier 401 to controlled rectifier 403 as the latter rectifier now has the most negative of the line to neutral phase voltages applied to its cathode. The current path now extends from alternating current supply line 22, containing the phase B line to neutral voltage, through controlled rectifier 402 to the positive direct current bus 24 and the load 28, from the load 28 to negative direct current bus 26, and from the negative direct current bus 26 through controlled rectifier 403 to alternating current supply line 21 containing the phase A line to neutral voltage. Upon the shifting of the current flow to controlled rectifier 403, the current flow through controlled rectifier 401 to alternating current supply line 21 and phase C ceases. This shifting of the path of the current flow from controlled rectifier 401 to controlled rectifier 403 is termed commutation and occurs automatically in a rectifier bridge in which the rectifiers are free to conduct anytime they are properly biased.

Later, at time $T_{C2}$, the phase C line to neutral voltage in alternating current supply in 21 becomes the most positive voltage in the power supply. When this voltage is applied to the anode of controlled rectifier 404, connected to alternating current supply line 21, it overcomes the bias placed on the cathode of that controlled rectifier by the phase B voltage presently being conducted through controlled rectifier 402 to positive direct current bus 24. This causes controlled rectifier 404 to commence conduction and current to flow from alternating current supply line 23 through controlled rectifier 404 to positive direct current bus 24. The current flow through controlled rectifier 404 applies a voltage to the cathode of controlled rectifier 402 which is greater than the voltage applied to the anode of that rectifier by the phase B line to neutral voltage in alternating current supply line 22, thereby biasing controlled rectifier 402 into the nonconductive state. Thus, commutation from the phase B line to neutral voltage supplied to positive direct current bus 24 by controlled rectifier 402 to the phase C line to neutral voltage conducted to positive direct current bus 24 by controlled rectifier 404 has occurred. The path of the current flow now extends from alternating current supply line 23, containing the phase C line to neutral voltage, through controlled rectifier 404 to positive direct current bus 24 and the load 28, from the load 28 to negative direct current bus 26, and from negative direct current bus 26 through controlled rectifier 403 to alternating current supply line 21 containing the phase A line to neutral voltage.

The above described commutation or shifting continues through the remainder of the operative cycle of rectifier bridge 40 so that current always flows from the alternating current supply line containing the most positive line to neutral voltage, through the rectifier connected to that alternating current supply line to the positive direct current bus and from the negative direct current bus through the rectifier connected to the alternating current supply line containing the most negative voltage to that supply line and the power supply.

The voltage applied to the direct current buses will be the line to line voltages shown in FIGURE 2. Line to line voltages are measured between two of the alternating current supply lines 21, 22 and 23 and express the total differential voltage between any two of these lines. At time $T_1$ the phase C to phase B line to line voltage will be supplied to the direct current buses through conducting controlled rectifiers 401 and 402. This voltage is shown in FIGURE 2 by the graph labeled CB. At time $T_{C1}$, controlled rectifier 401 is commutated off and controlled rectifier 403 becomes conducting, and the voltage supplied to the positive and negative direct current buses becomes the phase A to phase B line to neutral voltage shown by the graph AB. At time $T_{C2}$ controlled rectifier 402 is commutated off and controlled rectifier 404 becomes conducting. The voltage supplied to positive and negative direct current buses becomes the phase A to phase C line to line voltage shown by the graph AC. As indicated in FIGURE 2, the above described rectification continues to supply the positive and negative direct current buses 24 and 26 with rectified alternating current for all polarities of the alternating current waves in alternating current supply lines 21, 22 and 23. Further, as indicated in FIGURE 2, the individual controlled rectifiers 401 through 406 which conduct such line to line voltages are shown adjacent the line to line voltage graphs. The controlled rectifier which is fired on to produce such voltage is described last.

If it is desired to regulate the magnitude of the power supplied to positive direct current bus 24 and negative direct current bus 26, the conduction interval of controlled rectifiers 401 through 406 in rectifier bridge 40 may be lessened so that they do not conduct for the entire time interval during which they are properly biased for conduction. This lessening of the conduction interval is accomplished by control of the firing signals to the gate terminals of the controlled rectifiers as previously described.

Thus, instead of allowing controlled rectifier 403 to become conducting at time $T_{C1}$, as would normally occur due to commutation, the application of the firing signal to the gate terminal of controlled rectifier 403 may be delayed until time $T_2$. Controlled rectifier 403 will be rendered conductive at that time to supply phase A to phase B line to line voltage to the positive and negative direct current buses 24 and 26. However, the power supplied to the direct current buses will be less than if controlled rectifier 403 had been rendered conductive at time $T_{C1}$ since the phase C to phase B line to line voltage supplied to the buses is decreasing during the time interval $T_{C1}$ to $T_2$ whereas if controlled rectifier 403 had been rendered conductive at time $T_{C1}$, the phase A to phase B line to line voltage which would have been applied to the buses would have been increasing. The more the firing angle of controlled rectifier 403 is retarded, the lesser the amount of power which will be supplied to direct current buses 24 and 26 from AC supply lines 21, 22 and 23.

If the firing angle of the controlled rectifiers is retarded sufficiently, the rectified alternating current supplied to positive direct current bus 24, the load 28, and negative direct current bus 26 may become discontinuous. That is, the current in the load circuit may die out between the rectified portions of the alternating current waves being supplied to the positive and negative direct current buses. This will occur particularly with resistive loads or with loads of small inductance but will occur with passive loads of any inductance if the firing angle is sufficiently retarded. In the past, the serious control problems that have occurred in the operation of a rectifier bridge have occurred under such discontinuous conditions. One such problem is the phenomenon of shoot-through. Another is the matter of hard firing of the rectifiers.

Turning first to the problem of shoot-through, if load 28 is resistive in electrical characteristics, there is a clearly defined limit to the amount by which the firing angle of the controlled rectifier may be retarded. In the instance of controlled rectifier 402 this limit is time $T_{C2}$, as shown in FIGURE 2, since at that point the polarities of the phase C and phase B line to neutral voltages reverse, thereby reverse biasing controlled rectifiers 402 and 401 and rendering them nonconductive, regardless of any firing signal applied to the gate terminals of the controlled rectifiers. If, however, load 28 is inductive in nature, the current flow through positive direct current bus 24, load 28 and negative direct current bus 26 may continue after the point at which the controlled rectifiers would normally be biased off, that is, beyond time $T_{C2}$. This will force controlled rectifier 402 and controlled rectifier 401 to continue in the conductive state beyond time $T_{C2}$ even though the polarity of the phase C line to neutral voltage and the phase B line to neutral voltage have reversed. If rectifier 403 is not rendered conductive, the inductive current will eventually die out at a time dependent upon the magnitude of the inductance of load 28 and controlled rectifiers 402 and 401 will cease conducting. If controlled rectifier 403 is rendered conductive, it will commutate controlled rectifier 401 off and conduct the current flow through the load.

If however, the inductance of load 28 is large enough, and if controlled rectifier 403 is not previously fired on the inductive current of load 28 will extend for a sufficient period of time to cause shoot-through. Further, if load 28 is an active load, shoot-through may occur at lower values of inductance. Shoot-through under some conditions generates a high and often damaging current through the load and occurs under the following circumstances. If the inductive current of the load 28 is sufficiently great, it will cause controlled rectifiers 402 and 401 to remain in the conductive state past time $T_3$. Up to time $T_3$, the phase A line to neutral voltage is more negative than the phase C line to neutral voltage so that should controlled rectifier 403 receive the proper firing signal, it will be rendered conductive to conduct current flow through positive direct current bus 24, the load 28, and negative direct current bus 26 and to commutate controlled rectifier 402 off. At time $T_3$, however, the phase C line to neutral voltage becomes more negative than the phase A line to neutral voltage. This means that if the inductive current of load 28 causes controlled rectifier 402 and 401 to remain conducting after time $T_3$ and if controlled rectifier 403 is not rendered conductive prior to time $T_3$, controlled rectifier 401 biased by the phase C line to neutral voltage will continue to conduct since the phase C line to neutral voltage is more negative than the phase A line to neutral voltage. For the same reason, controlled rectifier 403 cannot be rendered conductive, regardless of any gate signal supplied thereto because the phase A line to neutral voltage supplied to it is less negative than the phase C line to neutral voltage being supplied to negative direct current bus 26 by controlled rectifier 401. As the anode of controlled rectifier 403 is connected to negative direct current bus 26, the phase C line to neutral voltage in that bus effectively reverse biases controlled rectifier 403 and prevents its conduction.

Controlled rectifier 401 thus continues to remain in the conductive state. At time $T_4$, the polarity of the phase C line to neutral voltage and the phase B line to neutral voltage reverses and controlled rectifier 401, and controlled rectifier 402 again supply energy to positive direct current bus 24, load 28, and negative direct current bus 26. This energy supply must continue until at least time $T_5$ when the polarity of the phase A line to neutral voltage and the phase C line to neutral voltage again reverses and the phase A line to neutral voltage becomes more negative than the phase C line to neutral voltage. This allows controlled rectifier 403 to be rendered conductive. As can be seen from FIGURE 2, a large amount of energy is supplied to load 28 during the time interval between time $T_4$ and time $T_5$. The phase C to phase B line to line voltage is said to "shoot-through" from the negative to the positive half cycle of the alternating current wave to supply power between time $T_4$ and time $T_5$. This can result in high and damaging currents through load 28.

The phase C to phase B line to line voltage will continue to be supplied to positive direct current bus 24, load 28, and negative direct current bus 26 until controlled rectifier 403 is rendered conductive, at time $T_5$ or thereafter, and controlled rectifier 401 is commutated off. If controlled rectifier 403 is not rendered conductive by time $T_6$, the whole process repeats itself and another surge of current passes through load 28.

If rectifier bridge 40 is used to supply a load 28 having active electrical characteristics, that is, if the load generates a counter EMF, and if the rectifier bridge is operated at greatly retarded firing angles, shoot-through may occur with small load inductances. The decreased load inductance increases the likelihood of damage from shoot-through current surges.

The control of the present invention prevents shoot-through from occurring by providing, under all circumstances, a firing signal to controlled rectifier 403 no later than 15 electrical degrees prior to time $T_3$, thereby to insure that at or before time $T_3$ controlled rectifier 403 will be conducting and controlled rectifier 401 will be commutated off. Such a firing signal may be termed a residual firing signal.

It is, therefore, an object of the present invention to provide an electrical control circuit for operating the controlled rectifiers of a rectifier bridge which insures that shoot-through will not occur regardless of the amount by which the firing angles of the controlled rectifiers are retarded.

It is a further object of the present invention to provide an electric control circuit for operating the controlled rectifiers of a rectifier bridge which prevents shoot-through by providing, under all circumstances, at least one firing signal to each of the controlled rectifiers during the time interval in which it is potentially conductive so as to insure the commutation between the rectifiers will occur.

Regarding the problem of hard and soft firing, this problem is also prevalent during discontinuous firing of the controlled rectifiers in the rectifier bridge 40. As previously noted, prior art electrical control circuits operated the controlled rectifiers by providing the firing signal through a capacitor. This resulted in a large initial firing signal being applied to the controlled rectifier gate terminal followed by a "tail out" formed by a residual voltage that was additive to the capacitive voltage. For example, at time $T_0$ such a control circuit fired on controlled rectifier 402 by an enlarged capacitive signal applied to its gate terminal. During the conductive interval, the voltage applied to the controlled rectifier was reversed at time $T_{C2}$, and the load current discharged inductively through the controlled rectifier. Eventually the load current died out and controlled rectifiers 402 and 401 ceased conducting. However, the tail out signal remained applied to the gate terminal of controlled rectifier 402. When controlled rectifier 403 was fired on, to again supply power to the direct current buses, controlled rectifier 402 was rendered conductive by the low magnitude tail out signal remaining applied to its gate. The utilization of the smaller gate signal caused the controlled rectifier to take a considerable period of time to reach the fully conducting state. This increased the losses occurring as the controlled rectifier assumed the conducting state and decreased its service life.

The firing of controlled rectifier 402 by the small tail out gate signal remaining applied to its gate during the time interval when no current was being conducted through the load is termed soft firing. This is to be distinguished from hard firing in which a new gate signal is applied to the controlled rectifier after the time interval when no current is being conducted through the load.

The present invention provides an electrical control circuit which supplies a large gate signal to both rectifiers which are to conduct current to and from the direct current buses, regardless of whether the rectifier is the one which was previously conductive and will continue to conduct current, such as controlled rectifier 402 in the example above, or is the newly conductive one such as controlled rectifier 403 in the example above. In this it differs from prior art control circuits in which only the newly conductive rectifier was supplied with a gate signal and the previously conductive rectifier was fired on by the tail out gate signal.

Further, during discontinuous firing of the controlled rectifiers, a large magnitude firing pulse of considerable time duration is supplied to the controlled rectifiers by the electrical control circuit of the present invention. This insures that the controlled rectifiers will be turned on to prevent the aforementioned problems of shoot-through and soft firing of the controlled rectifiers. During continuous firing, that is, when the firing angles of controlled rectifiers 401 through 406 are advanced, the above mentioned problems are not as critical and it is therefore a feature of the control of the present invention to reduce the time duration of the firing signal supplied to the gate terminals of the controlled rectifiers as the firing angle of the controlled rectifiers increases. This provides increased efficiency to the operation of the control throughout the entire range of firing angles.

*Objects*

An object of the present invention is to provide an electrical control circuit for converting alternating current to an adjustable magnitude direct current including a plurality of firing circuits for operating the controlled rectifiers of a rectifier bridge to provide such conversion, said firing circuits permitting the controlled rectifiers to fire after one time in their conductive interval, forcing the controlled rectifiers to fire near the end of their conductive intervals, and regulating the firing of the controlled rectifiers during the remaining portion of the conductive intervals.

Another object of the present invention is to provide firing circuits of the type described above which are operated by line to neutral and line to line voltages of alternating current to provide the above described operation to the controlled rectifiers of the rectifier bridge.

Another object of the present invention is to provide an electrical control circuit for converting alternating current to an adjustable magnitude direct current including a plurality of firing circuits for operating the controlled rectifiers of a rectifier bridge to provide such conversion, said control circuit including crossing detectors sensitive to the incoming line voltages for operating said firing circuits and for rendering the operation of the firing circuits instantaneous in response to changes in the regulating signal and insensitive to changes in the magnitude and frequency of the line voltages.

An additional object of the present invention is to provide an electrical control circuit for converting alternating current to an adjustable magnitude direct current wherein proper operation of the control circuit will be maintained even if the regulating signal utilized thereby is beyond normal limits or if a phase of the alternating current supply is lost for a time interval.

A further object of the present invention is to provide such firing circuits having means to eliminate noise to the firing circuits from the controlled rectifiers.

A still further object of the present invention is to provide an electrical control circuit for converting alternating current to an adjustable magnitude direct current including a plurality of firing circuits for operating the controlled rectifiers of a rectifier bridge to provide such conversion, said plurality of firing circuits operating in an endless, sequential manner to insure the correct firing sequence to the controlled rectifiers of the rectifier bridge.

Yet another object of the present invention is to provide such firing circuits which provide the above described operation and which are unaffected by line voltage commutation notches.

Another object of the present invention is to provide an electrical control containing a plurality of the above described firing circuits and including a timing circuit operable in conjunction with said firing circuits to prevent false sequential operation of the firing circuits by commutation notches appearing in the line voltages used to operate the firing circuits or by rapid changes in the regulating signal.

A further object of the present invention is to provide an electrical control circuit for the conversion of alternating current to an adjustable magnitude direct current including a plurality of firing circuits for operating the controlled rectifiers of the rectifier bridge to provide such conversion, said control circuit including a circuit operable in conjunction with said firing circuits to insure that the controlled rectifiers are fired near the end of their conductive intervals.

A still further object of the present invention is to provide a circuit operable in conjunction with the firing circuits to insure that the firing circuits generate firing signals near the end of the conductive intervals of the controlled rectifiers operated by the firing circuits.

An object of the present invention is to provide an electrical control circuit for converting alternating current to an adjustable magnitude direct current of either polarity.

Another object of the present invention is to provide an electrical control circuit for converting alternating current to an adjustable magnitude direct current of either polarity including means for preventing a change in polarity prior to the passage of a given time delay and prior to the cessation of current flow through the circuit load thereby preventing short circuits through the load.

A still further object of the present invention is to provide a means for use in conjunction with an electrical control circuit for converting alternating current to an adjustable magnitude direct current of either polarity, said means preventing a change in polarity prior to the passage of a given time delay and prior to the cessation of current flow through the circuit load thereby preventing short circuits through the load.

Other objects and advantages of the present invention appear hereinafter in the specification, reference being had to the accompanying drawings.

*Drawings*

FIGURE 5 is a detailed schematic diagram of a controlled rectifier firing circuit utilized by the electrical control circuit of the present invention.

FIGURE 7 is a detailed schematic diagram showing another embodiment of a controlled rectifier firing circuit which may be utilized in the electrical control circuit of the present invention.

FIGURE 12 is a detailed schematic diagram of a timing circuit which may be used in conjunction with the firing circuit of FIGURE 13 in the electrical control circuit of the present invention.

FIGURE 13 is a detailed schematic diagram of another embodiment of a firing circuit which may be used in the electrical control of the present invention. This embodiment of the firing circuit is termed a ring counter firing circuit.

FIGURE 14 is a detailed schematic diagram of an input circuit which may be employed with the embodiment of the firing circuit shown in FIGURE 13.

Brief Description

Figure 1:
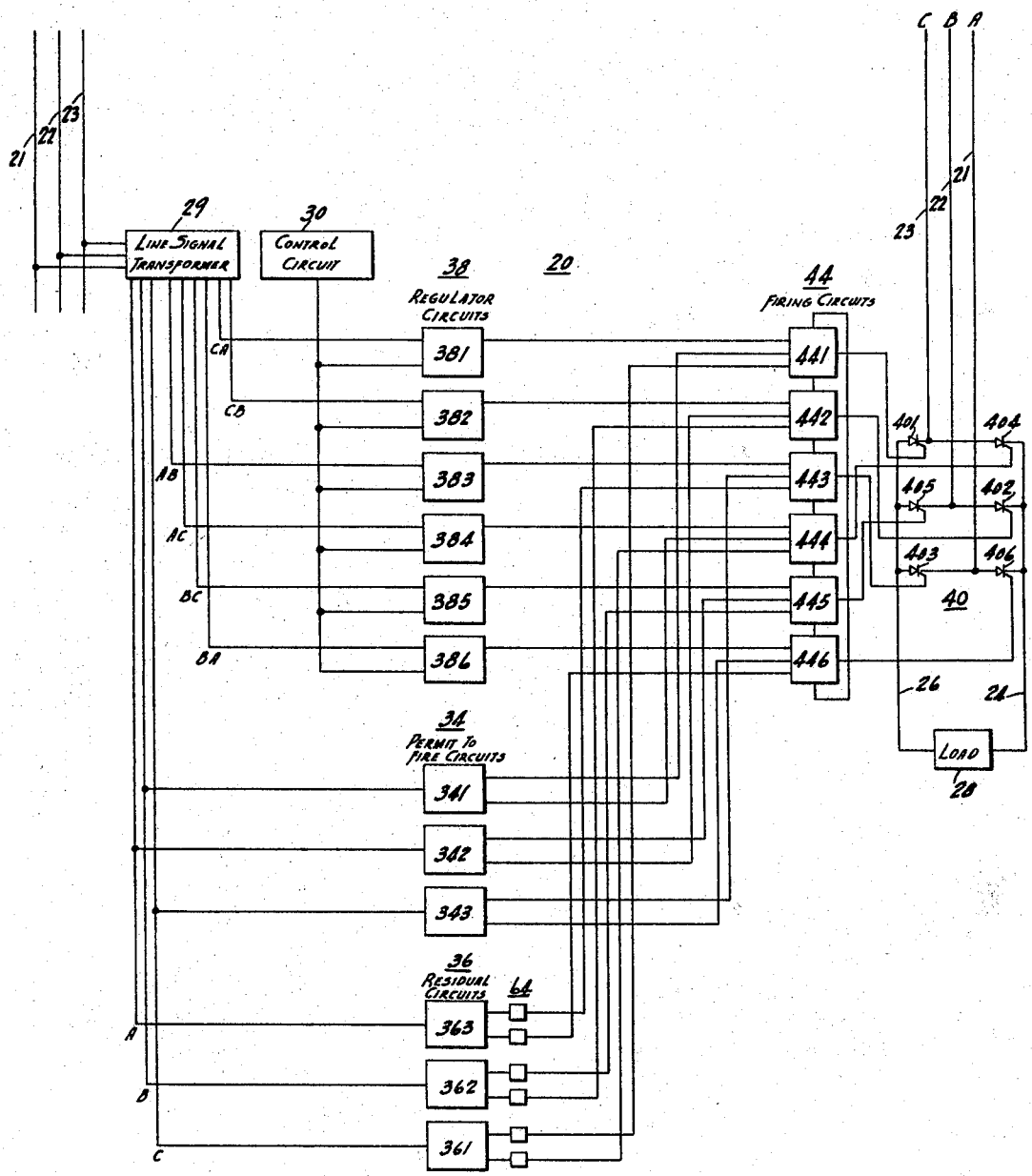
FIGURE 1 is a schematic diagram of one embodiment of the electrical control circuit of the present invention capable of supplying a unipolar direct current output, the components thereof being shown in block form.
Figure 2:
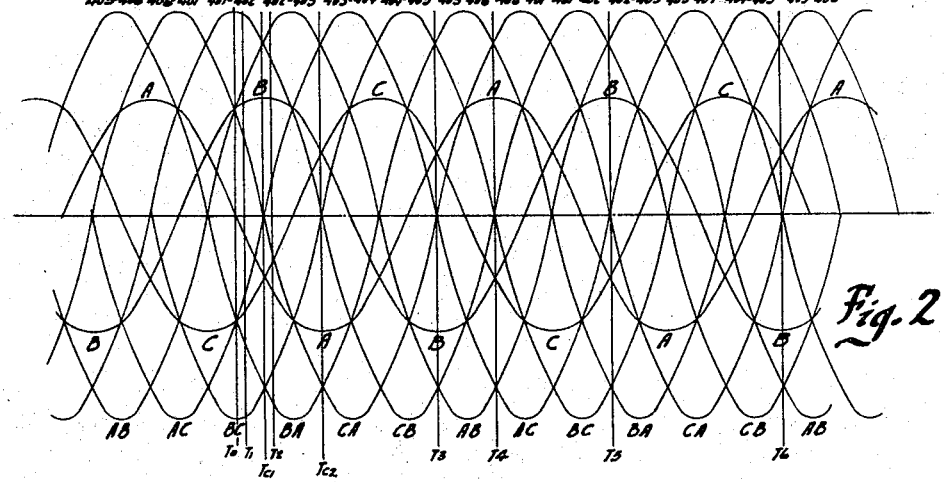
FIGURE 2 is a graph showing various line to neutral voltages and line to line voltages present in three-phase alternating current power.

Referring now to FIGURE 1, there is shown therein an electrical control circuit of the present invention indicated generally by the numeral 20. Circuit 20 converts the alternating current existing in alternating current supply lines 21, 22, and 23 to direct current in buses 24 and 26. Control circuit 20 includes signal sources which generate the signals required for operation of the control circuit, regulating elements which utilize the aforesaid signals to regulate the operation of the control circuit and power elements which are regulated by the regulating elements to provide direct current power to buses 24 and 26 and load 28.

Briefly, the signal sources include a line signal transformer 29 which provides the line to line and the line to neutral voltage signals used in control circuit 20 and a regulating signal circuit 30 which controls the magnitude of the direct current in buses 24 and 26. The power elements of control circuit 20 include controlled rectifier bridge 40 and firing circuits 44. The regulating elements of control 20 include a plurality of permit to fire circuits 34 which permit the controlled rectifiers of the bridge to fire after an initial point in time, a plurality of residual firing circuits 36 which force firing of the controlled rectifiers at the end of a period of time extending from the initial point in time, and regulator circuits 38 which regulate the instant of firing of the controlled rectifiers during the period of time.

Line Voltage Signal Transformer

Figures 3, 4:
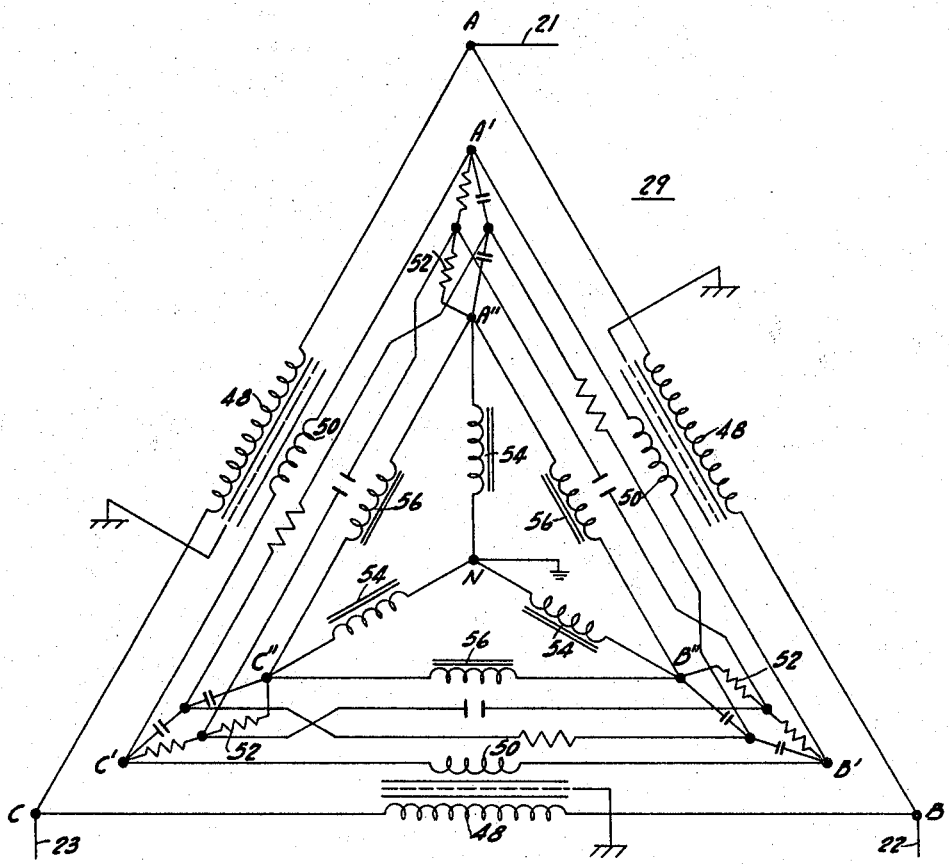
FIGURE 3 is a schematic diagram of a line signal voltage transformer which may be used as one element of the electrical control circuit shown in FIGURE 1 to provide line to neutral and line to line voltage signals employed in the control circuit.
FIGURE 4 is a schematic diagram of a regulating signal circuit which may be employed in the control circuit of the present invention.

Turning now to the details of the above mentioned elements, the line voltage signal transformer 29 is shown in detail in FIGURE 3. The primary windings 48 of the transformer are connected to each other and to alternating current supply lines 21 through 23 in a delta configuration. The secondary winding 50 of transformer 29 is also connected in a delta configuration. Secondary windings 50 are connected through filters 52 to two sets of voltage signal transformer primary windings. Filters 52 may be of the bridged T capacitive-resistive type to provide zero phase shift between the secondary transformer windings 50 and the voltage signal transformer primary windings. Filters 52 also eliminate noise in the control signal transformer due to commutation notches in the line voltage.

One of the aforementioned voltage signal transformers contains primary windings 54 which are connected in a star configuration. The other voltage signal transformer includes primary windings 56 which are connected in a delta configuration. Voltage signal transformer primary windings 54 provide line to neutral voltages in voltage signal transformer secondary windings 58 shown separately from transformer 29 in FIGURE 3. Secondary windings 58 may be balanced by resistive or other means (not shown) to insure production of the proper line to neutral voltages. Voltage signal transformer primary windings 56 provide line to line voltage signals and voltage signal transformer secondary windings 60, also shown separately from transformer 29 in FIGURE 3.

Thus, line signal transformer 29 provides signals proportional to the line to neutral voltage signals in transformer secondary windings 58 and signals proportional to the line to line voltage signal in transformer secondary windings 60. It will be appreciated that means other than the specific embodiment of transformer 29 shown in FIGURE 3 may be employed to provide a desired line voltage signal in control 20.

Regulating Signal Circuit

Circuit 30 may be any circuitry which provides an adjustable regulating signal corresponding to the peak voltage desired from rectifier bridge 40. FIGURE 4 shows such a circuit containing a DC source, shown as battery 62, connected in series with a grounded potentiometer 66. The series circuit contains an on-off switch 68 which provides for the removal of the regulating signal. The bipolarity adjustable voltage signal provided by potentiometer 66 is supplied to regulator circuits 38.

Regulator circuits, permit to fire circuits, and residual circuits

Regular circuits 38, along with permit to first circuits 34, and residual circuits 36 may comprise differential amplifiers, Schmitt trigger circuits, or other circuits which provide a change in output signal when the polarity of the input signal changes. Such circuits are commonly known as crossing detectors because of their function in detecting when the input signal changes polarity or crosses neutral. For purposes of explanation, regular circuits 38, permit to fire circuits 34, and residual circuits 36 will be described as differential amplifiers. Differential amplifiers are electronic amplifier circuits having a pair of differential outputs, That is, a change in the first output signal, in response to an input signal, will cause a corresponding, but opposite, change in the second output signal, therby giving rise to the differential characteristics of the amplifier. The differential amplifiers employed in regulator circuits 38, permit to fire circuits 34, and residual circuits 36 are generally of the high gain type and include appropriate output signal bounding circuits so that when an input signal of a given polarity is supplied to the differential amplifier, the first output contains a binary signal and the second output provides no output signal at all. When the polarity of the input signal is reversed, the first output has no signal, and the second output contains a binary signal. The first output of the differential amplifier may be termed the direct output, while the second output may be termed the inverted output. The differential amplifiers used in permit to fire circuits 34, and residual circuits 36 are provided with a grounded terminal, as shown in FIGURE 5, which serves as a polarity reference for the input signal. The differential amplifiers used in regulator circuits 38 are operated by the polarity reversal of two input signals thereto. Differenial amplifiers, and typical embodiments thereof, are shown and described in the SCR Manual, Second Edition, 1962, published by the General Electric Company.

In the case of the differential amplifiers comprising permit to fire circuits 34, the bi-polarity input signal supplied to these circuits comprises one of the line to neutral voltage signals in transformer secondary windings 58. When the line to neutral voltage is positive, an output signal is present in the direct output but not in the inverted output. When the line to neutral voltage is negative, an output signal is present in the inverted output but not in the direct output.

The differential amplifiers comprising residual circuits 36 also receive a line to neutral voltage signal and provide output signals in the same manner as the differential amplifiers comprising permit to fire circuits 34.

The differential amplifiers comprising regulator circuits 38 are supplied with two sets of input signals. One of the input signals is the desired peak voltage signal or regulating signal from control circuit 30. The other signal is a line to line voltage signal produced by transformer secondary windings 60 of transformer 28. These input signals are connected in a manner so that when the regulating signal from circuit 30 is negative with respect to the line to line voltage from transformer secondary windings 60, an output signal appears at the direct output of regulator circuit 38. When the regulating signal from circuit 30 is positive with respect to the line to line voltage from transformer secondary windings 60, no output signal appears at the direct output.

Regulator circuits 38, permits to fire circuits 34 and residual circuits 36 are connected to firing circuits 44, one of which is shown in FIGURE 5. This firing circuit, designated by the numeral 442 is connected and provides firing signals to controlled rectifier 402 of rectifier bridge 40. Controlled rectifier 402 is connected between alternating current supply line 22 and positive direct current bus 24, that is, it connects the B phase of the alternating current to bus 24.

*Firing circuits—construction*

The elements of firing circuit 442 comprise logic elements which provide an output signal only when proper input signals are applied thereto. The term logic, as used in the present application refers to a control method which employs elements operable by the states of the signals applied thereto rather than by the magnitude of the signals. One such state may be considered the presence of a signal, regardless of its magnitude, and the second state may be considered the absence of a signal. Because of the two signal states, such signals are termed binary signals. It is to be noted that the absence of a signal is considered a signal state and hence forms an operative signal. The logic elements operate in a coincidental manner to change the state of their output from one of having a signal to one of not having a signal, or vice versa, depending on the application of one or more binary input signals to the elements.

Typical circuits which may be employed as the coincidental elements are manufactured and sold by the Semi-Conductor Components Division of Texas Instrument Company, Dallas, Tex. under the commercial designation SN–7450 and the military designation SN–5450. The conventional symbols commonly used for these elements are employed in FIGURE 5 and the other figures of the specification drawings. One such coincidental element is termed a NAND gate. It does not provide an output signal when an input signal is supplied to its first, and second, and third input, etc. At all other times the NAND gate provides an output signal. The names NAND is derived from the "not" characteristics of the output signal and the "and" characteristics of the input signal. A NAND gate reverses the logic provided by an AND gate. This latter gate, as its name implies, supplies an output signal when an input signal is supplied to its first, and second, and third input, etc.

NAND gate 62 of firing circuit 442 receives an input from the inverted output of permit to fire circuit 342. The differential amplifier comprising permit to fire circuit 342 is operated by an input signal from voltage signal transformer secondary windings 58 corresponding to the phase A line to neutral voltage in the AC supply line. NAND gate 62 also receives an input signal from the inverted output of residual circuit 362 which is connected to and operated by a signal from voltage signal transformer secondary windings 58 corresponding to the phase B line to neutral voltage existing in the alternating current supply lines. The input signal to NAND gate 62 of residual circuit 362 is supplied to the gate through a delay circuit 64 which delays transmission of an output signal from the residual circuit to NAND gate 62 for a purpose hereinafter described.

The inverted output of permit to fire circuit 342 is also supplied as an input signal to NAND gate 66. The other input to NAND gate 66 is the output signal from NAND gate 68. NAND gate 68, in turn, receives an input signal from the output of NAND gate 66 as well as the output of NAND gate 62 and the direct output of regulator circuit 382. Regulator circuit 382 is operated by the output signal from regulating signal circuit 30 and by an input signal from voltage signal transformer secondary windings 60 which corresponds to the phase C to phase B line to line voltage existing in the alternating current supply lines. The connection of these input signals to the differential amplifier comprising regulator circuit 382 is such that an output signal will issue from the direct output of the amplifier to NAND gate 68 any time the phase C to phase B voltage is more positive than the reference signal from control circuit 30.

The output signal from NAND gate 66 serves as an input signal to one-shot multivibrator 72. The output signal from NAND gate 66 to multivibrator 72 causes the multivibrator to remove its output signal for a desired time interval corresponding to the length of the longest firing signal desired. Factors which determine the length of the firing signal, and hence the time interval of multivibrator 72, include the characteristics of the AC power supply, load 28, and the controlled rectifiers incorporated in rectifier bridge 40. Such an output signal removal may, for example, be .23 millisecond in duration. A typical one-shot multivibrator is shown on page 170 of the Transistor Manual, 1962, published by the General Electric Company or by the circuitry sold by the Semi-Conductor Components Division of Texas Instrument Company under the commercial designation SN–7380 and the military designation SN–5380.

The output of multivibrator 72 is supplied as an input signal to NAND gate 74 and to firing circuit 441, via conductor 71. NAND gate 74 is also supplied with an input signal from the multivibrator of firing circuit 443, via conductor 73, which firing circuit controls the operation of controlled restifier 403 connecting the negative bus 26 to phase C of the alternating current supply.

The output from NAND gate 74 is supplied to NAND gate 76. NAND 76 may also receive a signal from enabling conductor 110 as hereinafter described in connection with the enabling circuit 32. The output of NAND gate 76 is fed through inverting amplifier 78 to the base terminal of transistor 79 connected between isolating transformer 80, rectifiers 81 and 83, and transformer 85. Transformer 85 is supplied with power from AC supply line 21. The output of transformer 80 is connected to diode bridge 82 and the gate terminal of controlled rectifier 402.

The remainder of the firing circuits are connected to the various elements of control circuit 20 in a manner similar to firing circuit 442 discussed above in detail. In each case, the firing circuit is connected to a permit to fire circuit operated by the line to neutral voltage of the phase preceding the AC supply phase which the rectifier operated by the firing circuit controls. For example, firing circuit 441, whice operates controlled rectifier 401 connected between negative direct current bus 26 and phase C of the alternating current supply lines is connected to the direct output of permit to fire circuit 341. This permit to fire circuit is operated by the phase B line to neutral voltage supplied by line voltage signal transformer 29.

Each of the firing circuits is also connected to a residual circuit operated by the line to neutral voltage of the alternating current supply phase which the rectifier operated by the firing circuit controls. In the case of firing circuit 441, that circuit is connected to the direct output of residual circuit 361 which is operated by the phase C line to neutral voltage.

As both the permit to fire circuits 34 and the residual circuits 36 comprise crossing detectors, each of which has a direct output and an inverted, these same crossing detectors may be used for both the permit to fire circuits 34 and the residual circuits 36 if proper connections are made to each of the firing circuits 44. As may be seen from the connection table below, both the permit to fire circuit connected to firing circuit 442 and the residual circuit connected to firing circuit 446 must employ inverted output signals generated by the phase A line to neutral voltage. Thus, one differential amplifier may be used to provide such output signals to both these firing circuits. If desired, three differential amplifiers will suffice for both the permit the fire circuits and the residual circuits.

Each firing circuit is connected to a regulator circuit which is operated by a regulating signal from regulating signal circuit 30 and a line to line voltage signal from a line voltage signal transformer. In the case of firing circuit 441, the phase C to phase A line to line voltage is employed.

The following connection table shows in tabular form the connections between the various elements of control 20:

bus 28 and phase C provides a multivibrator output signal to firing circuit 446, controlling the operation of controlled rectifier 406 connecting phase A to positive bus 26.

Firing circuits—Operation

The operation of the firing circuits will be described using firing circuit 442 as an example. The operation may be more graphically understood by reference to FIGURE 6 which shows the various voltage signals required for the operation of the firing circuit. The operation of firing circuit 442, and of control 20, is regulated in accordance with the regulating signal 300 from regulating signal circuit 30 shown in FIGURE 5. Firing circuit 442 will fire controlled rectifier 402 which connects phase B of the alternating current supply to positive DC bus 26. At time $T_1$ in FIGURE 6 the phase A line to neutral voltage, shown by the graph labeled A, is positive with respect to neutral or ground. This line to neutral voltage, which operates permit to fire circuit 342, prevents a signal from issuing from the inverted output of that circuit. The phase B line to neutral voltage, shown by the graph labeled B in FIGURE 6, used to operated residual circuit 362, is also positive with respect to neutral and prevents a signal from issuing from the inverted output of that circuit.

Also at time $T_1$, the regulating signal 300 corresponding to the desired peak voltage is more negative than the phase C to phase B line to line voltage, permitting a signal to issue from the direct output of regulating circuit 382.

In the absence of signals from permit to fire circuit 342 and residual circuit 362 to its input, NAND gate 62 provides an output signal in accordance with the logic operation of that element. This output signal along with the output signal from regulator circuit 382 is supplied to NAND gate 68 and prevents an output signal from issuing from that element.

NAND gate 66 receives an input signal from neither NAND gate 68 nor permit to fire circuit 342 and hence provides an output signal to NAND gate 68 and multivibrator 72. The signal to multivibrator 72 causes an output signal to be supplied to NAND 74 and to firing circuit 441. The signal supplied to NAND 74 removes the output signal from that element to NAND gate 76 and causes the latter gate to supply an output signal to inverting amplifier 78. This signal when inverted prevents a firing signal from being applied to the gate terminal of controlled rectifier 402.

At time $T_2$ the phase A line to neutral voltage goes through zero and begins to assume a negative potential. The negative potential of the phase A line to neutral volt-

TABLE I

| Firing circuit | Controlled rectifier having gate associated with firing circuit (i.e. oncoming rectifier) | Controlled rectifiers fired on by firing circuits | AC phase to DC bus connection | Permit to fire circuit and AC line to neutral voltage employed | Residual circuit and line to neutral voltage employed | Regular circuit and line to line voltage employed |
|---|---|---|---|---|---|---|
| 441 | 401 | 401, 406 | Neg. bus to C phase | 341 Dir.[1] B | 361 Dir. C | 381 CA. |
| 442 | 402 | 402, 401 | B phase to pos. bus | 342 Inv.[2] A | 362 Inv. B | 382 CB. |
| 443 | 403 | 403, 402 | Neg. bus to A phase | 343 Dir. C | 363 Dir. A | 383 AB. |
| 444 | 404 | 404, 403 | C phase to pos. bus | 341 Inv. B | 361 Inv. C | 384 AC. |
| 445 | 405 | 405, 404 | Neg. bus to B phase | 342 Dir. A | 362 Dir. B | 385 BC. |
| 446 | 406 | 406, 405 | A phase to pos. bus | 343 Inv. C | 363 Inv. A | 386 BA. |

[1] Dir.—Direct output of circuit.   [2] Inv.—Inverted output of circuit.

Each of the firing circuits also receives an input signal from the firing circuit controlling the operation of the succeeding phase of the alternating current supply. For example, firing circuit 441 controlling controlled rectifier 401 in phase C receives a signal from firing circuit 446 controlling rectifier 406 in phase A.

The firing circuits provide a firing pulse to the respective controlled rectifier. The firing circuits also provide the output of the multivibrator to the firing circuit controlling the preceding phase of the alternating current supply. For example, firing circuit 441, controlling the operation of controlled rectifier 401 connected between the negative age causes permit to fire circuit 342, which receives a signal corresponding to this voltage, to issue an output signal from its inverted output to NAND gate 62 and NAND gate 66. As there is no signal at the other input to each of these elements, there is no change in the output signal therefrom. Rather, the input signals to NAND gate 62 and NAND gate 66 are permissive in nature in that they permit the firing circuit 442 to deliver firing pulses to controlled rectifier 402 anytime after the time at which the phase A line to neutral voltage becomes negative. The actual point of firing is determined by an output signal from regulator circuit 382 or by a signal from residual firing circuit 362 in the event there is no firing signal from regulator circuit 382.

At time $T_3$ the control signal 300 becomes more positive than the phase C to phase B line to line voltage. This reversal of the polarities of the input signals to regulator circuit 382 removes the output signal from the direct output of that circuit and removes one of the input signals to NAND gate 68. In accordance with the logic operation of a NAND gate, that gate issues an output signal. This output signal, along with the output signal from permit to fire circuit 342, is supplied to NAND gate 66 and removes the output signal from that element. The absence of an output signal from NAND gate 66 removes another input signal from NAND gate 68 insuring that an output signal will continue to be supplied therefrom.

The loss of an output signal from NAND gate 66 triggers multivibrator 72 to remove the output signal for the operative time interval of the multivibrator, for example, .23 millisecond. The removed output signal from the multivibrator 72 results in the loss of an input signal to NAND gate 74 and this input signal removal causes an output signal to issue from the output of that element.

The output signal from NAND gate 74 is supplied to the input of NAND gate 76 which removes the output of that gate. This causes inverting amplifier 78 to provide a signal to the base of transistor 79 to render the transistor conductive and generate a rectified voltage wave in transformer 85. This wave supplies a firing signal to the gate of controlled rectifier 402 to fire the rectifier. The firing signal is supplied for the entire time period of multivibrator 72 to insure firing of the rectifier. The time period of the multivibrator may be altered to alter the length of the firing signal. Diode bridge 82 and the grounded electrical transformer core of transformer 80 remove noise to the firing circuits.

When multivibrator 72 reverts to its natural state, during which it provides an output signal, the input signal to NAND gate 76 is removed. This causes an output signal to issue from NAND gate 76 which removes the output signal from inverting amplifier 78 to transistor 79 and the firing signal from the gate of controlled rectifier 402. The output signal from multivibrator 72 is supplied to NAND gate 74 and along with the output signal from firing signal 443 removes the output from NAND gate 74 to insure that no further firing pulses are supplied to the gate terminal of controlled rectifier 402.

Figure 6:
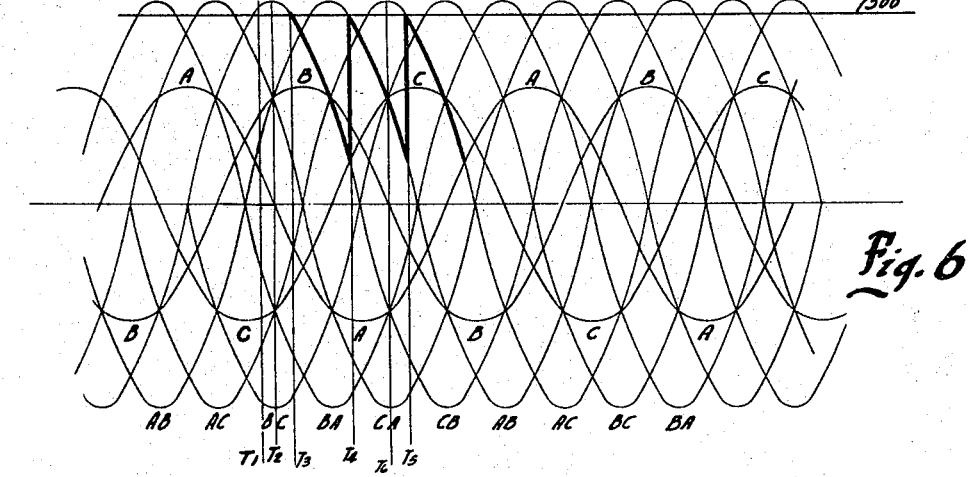
FIGURE 6 is a graph showing the line to neutral voltages and line to line voltages present in the three-phase alternating current power applied to the electrical control circuit of the present invention and the direct current output produced by the control circuit by the action of the controlled rectifiers.

Under conditions shown in FIGURE 6, the next firing circuit to be operated is firing circuit 443 which will render controlled rectifier 403 conductive. Thus, at time $T_4$, the phase A to phase B line to line voltage becomes more negative than the regulating signal 300. This causes regulator circuit 383, connected to firing circuit 443, to provide a signal to firing circuit 443 to generate a firing signal to controlled rectifier 403 in the same manner that regulator circuit 382 provided a signal to firing circuit 442 to generate a firing signal to controlled rectifier 402. Rectifier 403, upon becoming conductive, commutates controlled rectifier 401 off.

When the output signal from multivibrator 72 of firing circuit 443 is removed to cause a firing signal to be generated at the gate terminal of controlled rectifier 403, the removed output signal is also supplied, via conductor 73 to NAND gate 74 of firing circuit 442. This removed input signal to NAND gate 74 causes that gate to supply an output signal to NAND gate 76 which in turn removes the output signal of that gate and causes inverting amplifier 78 to issue an output signal to the base of transistor 79. This causes a firing signal to be generated at the gate terminal of controlled rectifier 402 so that that rectifier is positively fired on if it is not already conducting current. This allows the alternating current supply lines to supply phase A to phase B line to line voltage to positive direct current bus 24, load 28, and negative direct current line 26.

Thus each of the firing circuits 44 generate firing signals to two controlled rectifiers. One is the newly conductive controlled rectifier which commutates one of the previously conductive rectifiers off and one is the other previously conductive rectifier which will continue to conduct current. As a large gate signal is supplied to the gate terminals of both rectifiers by transformer 86 and the associated circuitry, both controlled rectifiers may be said to be hard fired. The controlled rectifiers which each of the firing circuits fires on is shown in tabular form in Table I.

At time $T_5$ controlled rectifiers 404 and 403 are rendered conductive by firing circuit 444 and controlled rectifier 402 is commutated off. Phase A to phase C line to line voltage is then supplied to the direct current buses. This operation continues in a cyclical manner to supply rectified alternating current power to the direct current buses. The sequence in which the rectifiers are rendered conductive and commutated off is shown in FIGURE 6 by the rectifier designations associated with the line to line voltage graphs.

The point at which firing pulses are provided to the controlled rectifiers depends on the magnitude of regulating signal 300. For example, if the magnitude of regulating signal is increased, the point $T_3$ at which the relative polarity of the phase C to phase B line to line voltage and the regulating signal reverses is moved toward point $T_2$. The firing of controlled rectifier 402 is advanced and the interval of conduction increased. If the regulating signal 300 is decreased, point $T_3$ is moved further from point $T_2$ and the firing of controlled rectifier 402 is retarded. This decreases the interval of conduction and the amount of alternating current supplied to positive direct current bus 24, load 28 and negative direct current bus 26.

Residual circuit 362 plays no part in the control of firing circuit 442 when a regulating signal 300 is provided thereto. Rather, it becomes active to control firing circuit 442 when a regulating signal is not supplied to the firing circuit to fire controlled rectifier 402 so that the controlled rectifier 402 is rendered conductive during the latter portion of its conductive interval. This provides a path for inductive energy in the load 28 of control circuit 20, permits commutation between the controlled rectifiers and prevents shoot through.

Considering first residual circuit 362 in its inactive state, that is, when a regulating signal 300 is supplied to firing circuit 442 as shown in FIGURE 6, the operation of residual circuit 362 is as follows. Residual circuit 362 is operated by the phase B line to neutral voltage generated by line signal transformer 28. At time $T_6$ the phase B voltage with respect to neutral reverses and phase B becomes negative. Time $T_6$ is subsequent to time $T_3$ at which controlled rectifier 402 is rendered conductive by firing circuit 442 and subsequent to the time at which multivibrator 72 returns to its normal state. When the polarity of the phase B line to neutral voltage reverses, an output signal issues from the inverted output of residual circuit 362. This output signal passes through delay circuit 64 and issues from the delay circuit approximately .7 millisecond later or 15 electrical degrees later. The output from delay circuit 64 is supplied to NAND gate 62 and, as an input signal is also supplied to that gate from permit to fire circuit 342, the output signal from the gate is removed. This removes an input signal to NAND gate 68 but as there are no other input signals at the other inputs of NAND gate 68, it has no effect on the output of that gate or the remainder of the operation of firing circuit 442.

However, if the relative polarity of the regulating signal 300 and the phase C to phase B line to line voltage has not reversed by the time the phase B line to neutral voltage goes to zero, that is, if regulator circuit 362 has not been rendered operative prior to .7 millisecond after time $T_6$, residual circuit 362 becomes active to operate firing circuit 442 to fire controlled rectifier 402 .7 millisecond after the phase B voltage goes through zero, to allow controlled rectifier 402 to conduct the inductive current in load 28 and to insure that controlled rectifier 401 is commutated off.

The operation of residual circuit 362 in its active state is as follows. Up to time $T_2$, the operation of firing circuit 442 is the same. That is, at time $T_2$, permit to fire circuit 342 provides an output signal to NAND gate 62 and NAND 66. Assuming regulator circuit 382 has not previously been rendered operative, time $T_6$ when the phase B line to neutral voltage goes through zero, residual circuit 362 provides an output signal to delay circuit 64. After the .7 millisecond delay, delay circuit 64 provides an output signal to NAND gate 62. As NAND gate 62 now has an input signal to both of its inputs, it ceases to provide an output signal. This causes the loss of one input signal to NAND gate 68 which removes the output signal from that element and, in turn, removes the output signal from NAND gate 66. This operates the remainder of firing circuit 442 in the same manner as the removal of the output of NAND gate 66 by regulator circuit 382, in response to regulating signal 300 and the phase C to phase B line to line voltage, operates firing circuit 442. That is, NAND gate 66 triggers multivibrator 72 to cause a firing pulse to be supplied to the gate terminal of controlled rectifier 402 to fire the rectifier.

FIGURE 7 shows another, slightly simplified, embodiment of firing circuits 44. In this embodiment the direct output, rather than the inverted output, of the differential amplifier comprising each of the residual circuits 361 is connected to delay circuit 64 in each of the firing circuits. Delay circuit 64 operates when the output signal is removed from the direct output of residual circuit 36 to delay the corresponding removal of the output signal from delay circuit 64 for the amount of the time delay. This time delay is generally .7 millisecond which corresponds to a fifteen electrical degree delay. The output of delay circuit 64 is supplied directly to the NAND gate 68 in each of firing circuits 44, thereby eliminating NAND gate 62.

The operation of the firing circuits 44 with the residual circuit connection shown in FIGURE 7 is identical to the operation of the circuit shown in FIGURE 5 as far as the permit to fire circuits 34 and regulator circuits 38 are concerned. Residual circuits 36 operate the firing circuit of FIGURE 7 in a similar, though not identical manner. Again making reference to firing circuit 442 which controls the operation of controlled rectifier 402 in rectifier bridge 40, the operation of residual circuit 362 in its inactive state is as follows and will occur when a regulating signal 300 is supplied to firing circuit 442 to fire controlled rectifier 402 at time $T_3$. At time $T_4$, subsequent to time $T_3$, an output signal is removed from the direct output of the differential amplifier comprising residual circuit 362 when the polarity of the phase B line to neutral voltage goes through zero. This loss of output signal in the direct output of residual circuit 362 is reflected in the loss of an output signal from delay circuit 64 at the end of the time delay of the circuit. This removes an input signal to NAND gate 68 but as there are no other input signals at the other inputs of NAND gate 68, it has no effect on the output of that gate or on the remainder of the operation of firing circuit 442.

The operation of residual circuit 362 in its active state, that is, when no signal is supplied by regulator circuit 382 at time $T_3$, is as follows. At time $T_6$ when the phase B line to neutral voltage goes through zero the output signal is removed from the direct output of the differential amplifier comprising residual circuit 362. After the .7 millisecond delay, the output of delay circuit 64 is also removed which causes the loss of one input signal to NAND gate 68. This removes the output signal from that element and, in turn, removes the output signal from NAND gate 66. This operates the remainder of firing circuit 442 in the same manner as the removal of the output of NAND gate 66 by regulator circuit 382 in response to regulating signal 300 and the phase C to phase B line to line voltage operates firing circuit 442. That is, NAND gate 66 triggers multivibrator 72 to cause a firing pulse to be supplied to the gate of controlled rectifier 402 to fire the rectifier. Controlled rectifier 402 thus conducts for the last .7 millisecond or fifteen degrees of its conduction period to allow inductive currents present in the load circuit to be dissipated, and to commutate controlled rectifier 401 off. This firing of controlled rectifier 402 occurs anytime controlled rectifier 402 has not been previously fired by regulator circuit 382 during the time interval in which controlled rectifier 402 is properly biased for conduction.

The remainder of firing circuits 441 to 446 operate in the same manner as firing circuits 442 described in detail above to fire the respective controlled rectifiers 401 through 406 at the appropriate time to generate direct current power in buses 26 and 24 and load 28.

As firing circuits 44 are operated by the instantaneous voltage supplied to regulating circuits 38, the control circuit is stable against line voltage changes. For example, in the event the voltages supplied to regulator circuits 38 by alternating current supply lines 21, 22 and 23 decrease, the line to line voltages employed by the regulator circuits becomes less than regulating signal 300 sooner in the conduction interval of the controlled rectifiers. This causes regulator circuits 38 to generate signals through firing circuits 44 to controlled rectifiers 401 through 406 of rectifier bridge 40 earlier and allows the controlled rectifiers to conduct for a greater time period, thereby supplying the lesser line voltage for a longer period of time and mantaining the same flow of power through the DC buses 24 and 26. If the line voltages increase, the firing angles of the controlled rectifiers are retarded as the line to line voltages employed by regulating circuits 38 become more negative than the control signal later in the conductive interval of the controlled rectifiers and the rectifier bridge 40 conducts the greater line voltages for a lesser time period. Thus, the power supplied to the direct current buses 24 and 26 remains the same, even though the line voltages in alternating current supply lines 21, 22 and 23 may vary.

For the reasons given above, the control circuit is also stable against line frequency variations.

As permit to fire circuits 34 determine the maximum firing angle and the residual circuits 36 determine the minimum firing angle for the controlled rectifier of rectifier bridge 40, excessive or minimal regulating signals from regulating signal circuit 30 cannot cause faulty operation of the firing circuits 44. For example, if an excessive regulating signal is generated by circuit 30, this signal would normally tend to cause the firing angle of the controlled rectifier to be greatly advanced. However, with firing circuits 44, the most that the firing angle can be advanced is the firing angle corresponding to the point at which permit to fire circuit 34 allows firing circuit 44 to fire. Thus the excessive regulating signal can advance the firing angle only to that point and no further. This prevents faulty operation of the control circuit.

Similarly, a minimal regulating signal from regulating signal circuit 30 can retard the firing angle of the controlled rectifier only to the point where residual circuit 36 causes firing circuit 44 to generate a firing signal. This presents minimal regulating signals from causing faulty operation.

Firing circuits 44 provide signals to controlled rectifiers 401 through 406 of rectifier bridge 40 for the entire time period during which the multivibrators 72 have no output signals. If for some reason the alternating current supply voltages are lost or become erratic and fail to fire the controlled rectifiers at or after the beginning of the time period, they will fire the controlled rectifiers at the point during the time period at which they return to their normal states. Thus these supply voltages may be lost for up to the entire time period of the multivibrators without affecting the operation of control circuit 20.

Bipolarity control circuit

Figure 9:
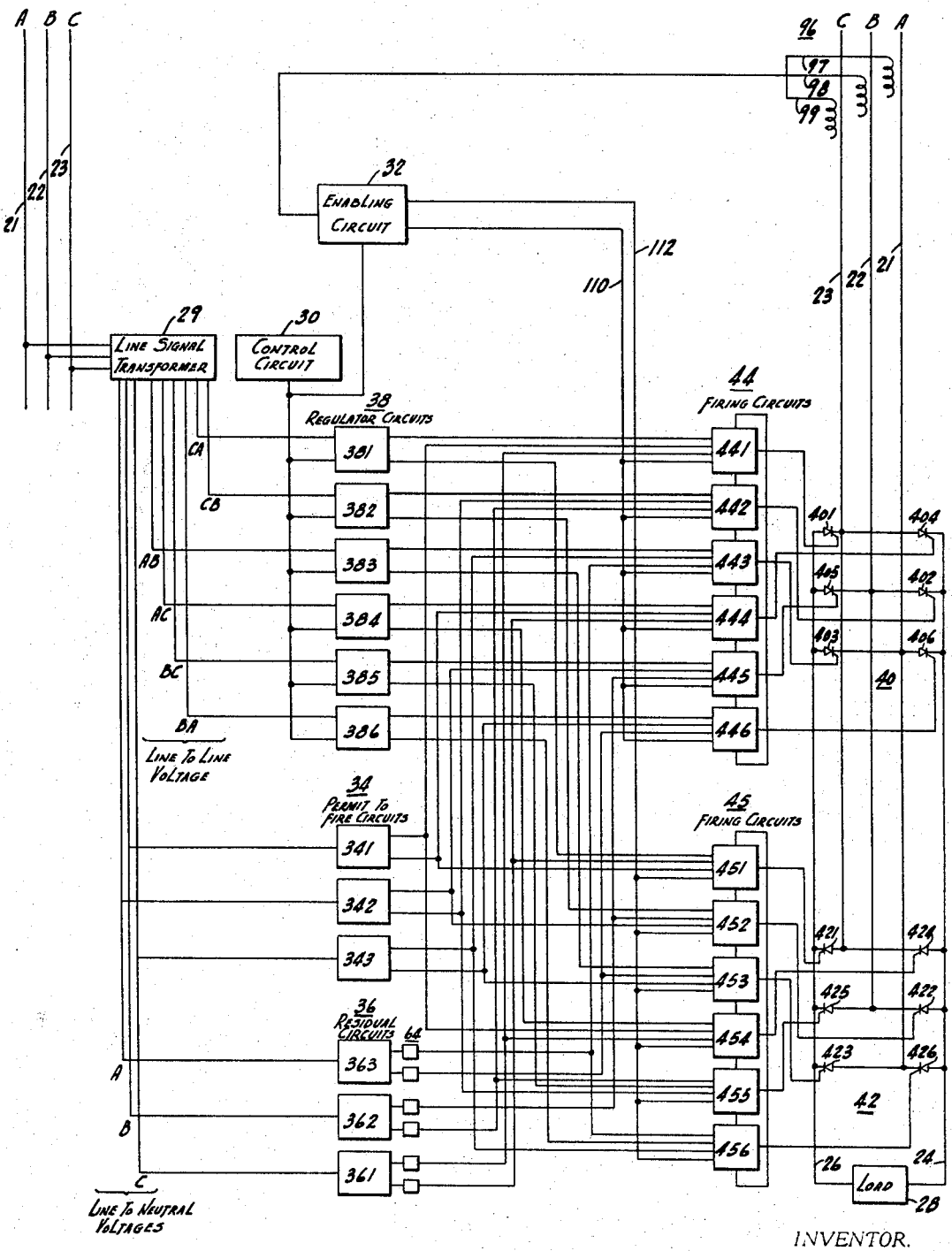
FIGURE 9 is a schematic diagram of an embodiment of the electrical control circuit of the present invention capable of supplying a bipolarity direct current output, the components thereof being shown in block form.

The direction of current flow through load 28 may be reversed by the addition of a second rectifier bridge 42 containing controlled rectifiers 421 through 426, as shown in FIGURE 9. These rectifiers are connected so as to cause current to flow into bus 26 and out of bus 24, thereby reversing the direction of current flow through the load. Controlled rectifiers 421 through 426 are controlled by firing circuits 451 through 456 which may be identical to firing circuits 441 through 446. Each of the firing circuits are connected to a permit to fire circuit 34, a regulator circuit 38, and a residual circuit 36 which operate the respective firing circuit in the same manner as firing circuits 441 through 446 are operated. Reference is hereby made to the preceding portions of the specification for a description of this operation. The connection of permit to fire circuits 34, regulator circuits 38, and residual circuits 36 to firing circuits 451 through 456 is summarized in the following connection table, Table II.

circuit 104. This insures that there will be no current flowing in alternating current supply lines 21, 22 and 23 at the time the switching between the two controlled rectifier bridges takes place.

Delay circuit 104 operates coincidence circuit 106, flip-flop circuit 108, and output circuitry 109 to provide an output signal in one or the other of enabling conductors 110 or 112 through inverting amplifiers 118 or 120, which renders either the firing circuits 44 or the firing circuits 45 operative.

Enabling circuit—construction

Referring now to enabling circuit 32 in detail, the output from inverting amplifier 102 is supplied to input NAND gate 116. Input NAND gate 116 also receives the noninverted output signals from output circuit 109, that is, the signals before they have been supplied to inverting amplifiers 118 and 120. This is supplied via conductors 160 and 162. Lastly NAND gate 116 receives a signal from NOR gate 158 of delay reset circuit 107. A NOR

TABLE II

| Firing circuit | Controlled rectifier having gate associated with firing circuit (i.e. oncoming rectifier) | Controlled rectifiers fired on by firing circuits | AC phase to DC bus connection | Permit to fire circuit and AC line to neutral voltage employed | Residual circuit and line to neutral voltage employed | Regular circuit and line to line voltage employed |
|---|---|---|---|---|---|---|
| 451 | 421 | 421, 426 | C phase to bus 26 | 341 Inv. B | 361 Inv. C | 381 Inv. CA. |
| 452 | 422 | 422, 421 | Bus 24 to B phase | 342 Dir. A | 362 Dir. B | 382 Inv. CB. |
| 453 | 423 | 423, 422 | A phase to bus 26 | 343 Inv. C | 363 Inv. A | 383 Inv. AB. |
| 454 | 424 | 424, 423 | Bus 24 to C phase | 341 Dir. B | 361 Dir. C | 384 Inv. AC. |
| 455 | 425 | 425, 424 | B phase to bus 26 | 342 Inv. A | 362 Inv. B | 385 Inv. BC. |
| 456 | 426 | 426, 425 | Bus 24 to A phase | 343 Dir. C | 363 Dir. A | 386 Inv. BA. |

Enable circuit

To prevent short circuits through load 28, caused by rectifiers in both rectifier bridge 40 and rectifier bridge 42 simultaneously being in the conductive state, control circuit 20 includes an enabling circuit 32 which permits only one of the rectifier bridges to conduct current at any given time. Enabling circuit 32 employs the polarity of regulating signal 300 produced by regulating signal circuit 30 to render either firing circuits 44 operative or firing circuits 45 operative in a manner hereinafter described.

A regulating signal 300 from control circuit 30 is supplied to the input of differential amplifier 90 via conductor 89. Differential amplifier 90 supplies a direct output conductor 92 and an inverted output conductor 94. When the regulating signal 300 is of one polarity, the direct output conductor 92 has an output signal therein while the inverted output conductor 94 has no signal present. For the other polarity of regulating signal 300, the situation is reversed, that is, a signal is present in inverted output conductor 94 and a signal is absent in direct output conductor 92.

Signals indicating the presence of current in alternating current supply lines 21, 22, and 23 to controlled rectifier bridges 40 and 42 are developed in current transformer 96. The phase windings of transformer 96 are connected in parallel, as shown diagramatically by windings 97, 98 and 99 in FIGURE 9, so that current of either polarity flowing in any phase will provide a current signal to enabling circuit 32. The current signal from current transformer 96 is supplied through rectifier bridge 100, which renders it unipolar, to inverting amplifier 102 which provides an output only when there is no input signal supplied thereto.

Enabling circuit 32 is operated by the polarity of regulating signal 300 and by the current signal from inverting amplifier 102 and provides a switching action to switch between firing circuits 44 and firing circuits 45 to change the direction of current flow in buses 24 and 26 and load 28. When it is desired to switch the direction of current flow through the load, enable circuit 32 delays the switching operation until the current in all of the alternating current supply lines has fallen to zero and remained at that value for the amount of a delay incorporated in delay gate provides no output signal when an input is supplied to its first or its second or its third input. At all other times, the NOR gate provides an output signal. A NOR gate employs the reverse logic of an OR gate which provides an output signal when an input signal is provided to its first or its second or its third input, etc. The name NOR gate is derived from the "not" characteristic of the output signal and the "or" characteristics of the input signals.

NAND gate 116 provides an output signal to NAND gate 117, as well as to AND gate 156 of delay reset circuit 107. NAND gate 117 provides an output signal to NAND gates 121, 123, and 127. NAND gate 123 also receives the output signal from NAND gate 125 and supplies an input signal to that gate and to NAND gate 121. The output signal of NAND gate 121 is supplied to delay circuit 104 to operate that circuit, when the output signal of NAND gate 121 is removed.

A multivibrator, such as is described in connection with other portions of the control circuit may be used as delay circuit 104. The time interval of its operation may be, for example, .23 millisecond. The transmission of the input signal from NAND gate 121 to delay circuit 104 is delayed for a brief interval, as indicated diagrammatically by capacitor 105, to allow certain elements in the delay circuit 104 to be reset.

The amount of the time delay provided by delay circuit 104 is determined, in general, by the sensitivity of the current measuring apparatus, such as transformer 96, rectifier bridge 100, and amplifier 102. The time delay is set in accordance with the minimum amount of current that can be measured with the apparatus. The lower the minimum current, the shorter the time delay of delay circuit 104 may be and still provide assurance that the current has, in fact, gone to zero in alternating current supply lines 21, 22, and 23. If the current sensing device is relatively insensitive, that is if it requires a great amount of current to operate it, the time delay of delay circuit 104 must, of necessity, be longer to insure that this greater amount of sensed current has dissipated in the load for control circuit 20.

The output signal of delay circuit 104 is supplied to NAND gates 125 and 127. NAND gate 125 also supplies an output signal to NAND gate 127 and to AND gate 156. The output of NAND gate 127 is supplied to NAND gate 119 and to NAND gate 132.

The output signal from NAND gate 119 is supplied to the input of parallel NAND gates 122 and 124. NAND gate 122 receives an input signal from direct output conductor 92 of differential amplifier 90 while NAND gate 124 receives an input signal from inverse output conductor 94 of differential amplifier 90.

Coincidence circuit 106 contains a pair of AND gates 126 and 128 which receive input signals from output conductors 92 and 94, respectively. AND gates 126 and 128 also receive input signals from flip-flop 108. The outputs of AND gates 126 and 128 form the inputs to NOR gate 130, the output of which is supplied to NAND gate 132. NAND gate 132 also receives input signals from NAND gate 127 and from regulating signal circuit 30, via conductor 152 and switch 153. The signal from control circuit 30 is passed through rectifier 157 to render it unipolar.

Delay reset circuit 107 contains a second pair of parallel AND gates 154 and 156, the output of which are fed to NOR gate 158. The output of NOR gate 158 is supplied to NAND gate 116, as mentioned above. The input to AND gate 154 comprises the output of NOR gate 130 while the input signals to AND gate 156 comprise the output signal from NAND gate 116 and the output signal from NAND gate 125.

Flip-flop 108 is so termed because of its bistable nature in which it provides an output signal to one of its outputs to the exclusion of a signal in the other of its outputs in response to one input signal and performs the reverse operation in response to a second signal. The element reverts to its original state upon the reappearance of the first input signal. Hence, the element is said to "flip" from the first output signal state to the second output signal state and then to "flop" from the second signal state back to the first signal state. A circuit having the bistable nature of flip-flop 108 may be formed of two parallel NAND gates, the output of each NAND gate being provided to the input of the other so that the lack of an output signal from one NAND gate forces an output signal from the other and vice versa. Such a bistable circuit may be formed of NAND gate 134 and NAND gate 136. As may be noted from FIGURE 10, the output of NAND gate 134 is supplied, via conductor 138, to the input of NAND gate 136 while the output from NAND gate 136 is supplied to the input of NAND gate 134 via conductor 140. NAND gate 134 also receives an input signal from the output of NAND 122. NAND gate 136 receives an input signal from the output of NAND gate 124. AND gate 126 of coincidence circuit 106 receives as an input signal, the signal in conductor 140 while AND gate 128 receives as an input signal, the signal in conductor 138.

Output circuit 109 is formed of NAND gate 142 and NAND gate 144, which are connected in a manner similar to NAND gates 134 and 136. NAND gates 142 and 144 do not form a true flip-flop since under certain conditions, and due to the additional output signals to the gates, output signals will issue from both gates. This is contrary to the mutual exclusivity of outgoing signals which characterizes a flip-flop. Conductor 146 containing the output of NAND gate 142 is connected to the input of NAND gate 144 while conductor 148 containing the output of NAND gate 144 is connected to the input of NAND gate 142. NAND gate 142 also receives an input signal from regulating signal circuit 30 via conductor 150 as well as an input signal from NAND gate 136. Both NAND gates 142 and 144 receive an output signal from NAND gate 159. NAND gate 159 receives input signals from NAND gate 132 and from inverting amplifier 102.

The output of NAND gate 142 is supplied through inverting amplifier 118 to enabling conductor 119 which is connected to one of the firing circuits 44 or 45. The output of NAND gate 144 is supplied through inverting amplifier 120 to enabling conductor 112 which is connected to the other of firing circuits 44 or 45. For example, enabling conductor 110 may be connected to firing circuit 44 while enabling conductor 112 is connected to firing circuit 45.

*Enable circuit—operation*

The operation of enabling circuit 32 is as follows and is described as switching the operation of control circuit 20 from a state of operating controlled rectifier bridge 40 containing controlled rectifiers 401 to 406 to a state of operating controlled rectifier bridge 42 containing controlled rectifiers 421 to 426. In such initial condition, enabling bus 110 contains an output signal which allows firing circuits 44 to fire the above mentioned controlled rectifier bridge while enabling bus 112 lacks an output signal and thus blocks the operation of firing circuits 45. To attain this initial condition, switch 68 is closed to provide a signal from regulating signal circuit 30 to differential amplifier 90 to provide an output signal to conductor 92 and prevent an output signal in conductor 94. A signal is also supplied in conductor 152 to NAND gate 132 and in conductor 150 to NAND gate 142 and NAND gate 144. Switches 151 and 153 in conductors 150 and 152, respectively, may be ganged to switch 68. Assuming current is flowing in the alternating current supply lines 21, 22, and 23, a signal is supplied to inverting amplifier 102 which is inverted by that amplifier so that the output thereof lacks a signal.

The output of inverting amplifier 102, which contains no signal, is supplied to NAND gate 116 along with the output signal from NAND gate 142 and NAND gate 144. NAND gate 142 provides no output signal so that inverting amplifier 118 may provide a signal in enabling conductor 110. NAND gate 144, on the other hand, does provide an output signal which is inverted by inverting amplifier 120 to block a signal in enabling conductor 112. This signal is also supplied to NAND gate 116 by conductor 162. As NAND gate 116 receives no input signal from NOR gate 158 of delay reset circuit 107 under the present circumstances, NAND gate 116 provides an output signal to NAND gate 117 and to AND gate 156. The output signal to NAND gate 117 removes the signal from that gate to NAND gates 121, 123 and 127. The removal of the output signal from NAND gate 117 causes all of these elements to issue output signals. The output signal from NAND gate 123 is supplied to NAND gate 125 and to NAND gate 121. The output signal from NAND gate 127 is supplied to NAND gate 119 to remove the output signal from that gate. The output signal from NAND gate 121 is supplied to delay circuit 104. Delay circuit 104 is presently issuing an output signal to NAND gate 125 and NAND gate 127. As NAND gate 125 receives an input signal from both NAND gate 123 and delay circuit 104, its output signal to NAND gate 127, NAND gate 123 and AND gate 156 is removed.

Since no output signal issues from NAND gate 119, no input signal will be supplied to one of the two inputs of NAND gates 122 and 124. This will cause an output signal to issue from both of these gates. Differential amplifier 90 provides an input signal to the other input of NAND gate 122, via conductor 92. No output signal appears in conductor 94 or is applied to the input of NAND gate 124.

The output signal from NAND gate 124 is supplied to NAND gate 136 of flip-flop 108 to remove the output signal of that gate. The removed output signal is supplied to the input of NAND gate 134, via conductor 140 to cause an output signal from NAND gate 134 in accordance with its logic function of providing an output signal when no input signal is supplied to one of inputs. The output signal of NAND gate 134 is supplied to NAND gate 136 via conductor 139 to insure that an output signal continues to issue therefrom. Thus, the bistable circuit formed by NAND gates 134 and 136 provides an output signal from NAND gate 134 but not from NAND gate 136.

The output signal from NAND gate 134 in conductor 138 is also supplied to AND gate 128 and the lack of an output signal in conductor 140 is communicated to AND gate 126. AND gate 126 receives an output signal at the other of its inputs from differential amplifier 90 via conductor 92 but does not issue an output signal because of the lack of an input signal in conductor 140. AND gate 128 receives no input signal in its input connected to conductor 94 so that it also does not issue an output signal. This causes a lack of input signals to NOR gate 130 and provides an output signal therefrom in accordance with the logic function of the NOR gate in providing an output signal when no input signals are applied to its first or second input. This signal indicates that the output signals in enabling conductors 110 and 112, as sensed by the signals in conductors 138 and 140 are in coincidence with the polarity signals in conductors 92 and 94. The output of NOR gate 130 is supplied to NAND gate 132. NAND gate 132 also receives input signals from NAND gate 127 and from conductor 152 which removes the output signal from NAND gate 132.

NAND gate 132 provides no output signal to NAND gate 159. The output of inverting amplifier 102 is also supplied to NAND gate 159, but as current is present in alternating current supply lines 21, 22 and 23, it provides an output signal to the inverting amplifier and no output signal is provided therefrom. This causes an output signal to issue from NAND gate 159 to NAND gates 142 and 144.

AND gate 154 receives an input signal from NOR gate 130 and thus provides an output signal to NOR gate 158 of delay reset circuit 107. AND gate 156 receives an input signal from NAND gate 116 but not from NAND gate 125 and thus, does not provide an output signal to NOR gate 158. This prevents an output signal from issuing from NOR gate 158 to NAND gate 116 under initial conditions, as previously described.

NAND gates 142 and 144 receive the output signal from regulating signal circuit 30, via conductor 150. NAND gate 142 receives an input signal from the output of NAND gate 134, an input signal from the output of NAND gate 144, and an input signal from the output of NAND gate 159. As all of the inputs to NAND gate 142 receive signals, the output signal is removed therefrom. This removal of the output signal from NAND gate 142 when inverted by inverting amplifier 118 provides the required output signal in enabling conductor 110 to operate firing circuits 44. NAND gate 144 has an input connected to the output of NAND gate 136 which, at this point, lacks an output signal and an input connected to the output of NAND gate 142, via conductor 148, which, at this point, also lacks an output signal so that an output signal is assured from the output of NAND gate 144. This output signal when inverted by inverting amplifier 120 prevents an output signal from forming in enabling conductor 112, thus preventing operation of firing circuits 45.

When it is desired to switch from control rectifier bridge 40, operated by firing circuits 44 to control rectifier bridge 42, operated by firing circuits 45, to effect a reversal in polarity of the direct current in buses 24 and 26, regulating signal circuit 30 is adjusted to reverse the polarity of the regulating signal 300 to differential amplifier 90. Thus, the control signal from regulating signal circuit 30 is made negative. This causes firing circuits 44 to retard the firing angles of controlled rectifiers 401 through 406 in rectifier bridge 40 and allows the current through the load to start decreasing. This reversal of the polarity of the input signal to differential amplifier 90 removes the output signal in conductor 92 and supplies an output signal in conductor 94, thereby providing an input signal to NAND gate 122 and removing the input signal from NAND gate 124. However, it does not effect the output signals of these elements or the signals in enabling conductors 110 and 112.

The removal of the output signal in conductor 92 removes the input signal to AND gate 126 but does not change its output signal. The presence of an output signal in conductor 94, along with the input signal provided by conductor 138 provides two input signals to AND gate 128 and causes that element to issue a signal to NOR gate 130. This removes the output signal of NOR gate 130 and one of the inputs to NAND gate 132, causing NAND gate 132 to issue an output signal. The removed output signal of NOR gate 130 is indicative that the signals in enabling conductors 110 and 112 are not in coincidence with the polarity signals in conductors 92 and 94. The removal of the output signal of NOR gate 130 also removes the input signal to AND gate 154, which removes the other input to NOR gate 158. This causes that element to issue an output signal to NAND gate 116.

The output signal from NAND gate 132 supplies an input signal to NAND gate 159 but does not change the output signal of NAND gate 159 to NAND gates 142 and 144.

After a certain period of time, depending upon the reactance characteristics of the load circuit, the current in each of the alternating current supply lines 21, 22 and 23 will fall to zero. When this occurs, the switch between controlled rectifier bridge 40 and 42 may safely take place. The lack of current in alternating current supply lines 21, 22 and 23 is sensed in current transformer 96 and the input signal is removed from inverting amplifier 102 to provide an output signal therefrom. This signal is supplied to NAND gate 116 and to NAND gate 159. NAND gate 159 is now receiving a signal indicating a lack of coincidence between the signals in the enabling conductors 110 and 112 and the polarity signals in conductors 92 and 94 and a signal indicating zero current in alternating current supply lines 21, 22 and 23. The output signal of that element to NAND gates 142 and 144 is removed and causes both of those elements to issue output signals. The output signals from NAND gate 142 and NAND gate 144 prevent an output signal from issuing from either inverting amplifier 118 or inverting amplifier 120 to enabling conductors 110 and 112. This prevents either of the firing circuits 44 or 45 from becoming operative during the switching interval from firing circuits 44 to firing circuits 45, thereby preventing any possibility of short circuits in the load circuit.

The output signal from both NAND gate 142 and NAND gate 144 is supplied to the input of NAND gate 116. As all of the inputs to that element receive input signals, the output signal is removed. This removes one of the input signals to AND gate 156 but does not effect the output of that element. This also removes the input signal from that element to NAND gate 117 which causes NAND gate 117 to issue an output signal to NAND gate 121. As NAND gate 121 is already receiving an input signal from NAND gate 123, its output signal is removed. The transmission of the removed output signal of NAND gate 121 to delay circuit 104 is delayed by capacitor 105. When supplied to delay circuit 104, the signal from NAND gate 121 starts delay circuit 104 and removes the output of that circuit for the interval of the time delay: that is, for .23 millisecond. This removes one of the inputs to NAND gate 127 but does not otherwise effect the operation of flip-flop 108, output circuitry 109, or the signals in enabling conductors 110 and 112. It also causes NAND gate 125 to remove its output signal.

Further, when an output signal is removed from delay circuit 104, a signal is supplied to NAND gate 123, which removes the output signal of that element as this element is now receiving input signals from both NAND gate 117 and NAND gate 125. This signal removal resets NAND gate 121 for the next succeeding operation by causing it to issue an output signal. Additionally, it removes one of the inputs to NAND gate 125 which, along with the absence of a signal from delay circuit 104, causes that element to issue an output signal to NAND gate 127.

This, however, does not effect the output signal of NAND gate 127 because of the lack of a signal to NAND gate 127 from delay circuit 104. This condition remains for the time delay provided by delay circuit 104 to insure that the current in alternating current supply lines 21, 22 and 23 has truly fallen to zero as evidenced by the absence of any current signal from current transformer 96 for the .23 millisecond of time delay.

Assuming that the current does, in fact, remain at zero for the period of the time delay, an output signal will again issue from delay circuit 104 at the end of the time delay period. This output signal will be supplied to NAND gates 125 and 127 and will remove the output signal from the latter NAND gate but will cause no change in the output signal of the former. The removed output signal of NAND gate 127 which constitutes an input signal to NAND gate 119, causes an output signal to issue from that NAND gate.

The output signal from NAND gate 119 is supplied to NAND gate 122 and NAND gate 124. As NAND gate is receiving an input signal from conductor 94, the output of this gate is removed. This output signal removal removes one of the input signals to NAND gate 136 and causes a signal to issue from that gate to NAND gate 144 and to NAND gate 134, via conductor 140. As NAND gate 134 is receiving input signals both from NAND gate 136 and from NAND gate 122, its output signal is removed. This, in turn, is supplied to NAND gate 136, via conductor 138, to insure that that element continues to provide an output signal. Flip-flop 108 is now in the "flipped" state.

The removed output signal of NAND gate 134 is also supplied to NAND gate 142 and to AND gate 128 to remove the output signal of the latter gate to NOR gate 130. The output signal of NAND gate 136 is supplied to AND gate 126, but as that gate receives no input signal from conductor 90, its output signal to NOR gate 130 remains removed. This causes NOR gate 130 to reissue an output signal to NAND gate 132 and to AND gate 154 indicating that the signals in conductors 138 and 140 are in coincidence with the polarity signals in conductors 92 and 94. In the absence of a signal from NAND gate 127, the state of NAND gate 132 is unaffected. AND gate 154, however, provides a signal to NOR gate 158 which removes the output signal of that element to NAND gate 116. This causes NAND gate 116 to provide an output signal to NAND gate 117 which removes the output from that gate to NAND gates 121, 123, and 127. This causes NAND gates 121, 123, and 125 to revert to the state they were in before the polarity of regulating signal 300 was reversed, resetting NAND gates 123 and 125 and causing NAND gate 127 to reissue an output signal to NAND gate 132 and NAND gate 119. The output signal to NAND gate 132 removes the output signal of that element to NAND gate 159 and causes that gate to issue an output signal to NAND gates 142 and 144.

The output signal to NAND gate 119 removes the output signal from that element to NAND gate 122 but does not change the condition of the output signal of that gate. It also removes one of the output signals to NAND gate 124, causing that element to issue an output signal to NAND gate 136. However, as there is no input in conductor 138, the output signal of NAND gate 136 is not changed. NAND gate 142, however, receives no input signal from NAND gate 136 and hence, continues to issue an output signal to inverting amplifier 118 and to NAND gate 144, via conductor 146. The output signal to inverting amplifier 118 prevents an enabling signal from appearing in conductor 110.

NAND gate 144, in addition to the input signal from NAND gate 142, receives an input signal from NAND gate 159, as previously mentioned, an input signal from NAND gate 136 and an input signal from conductor 150. As all the inputs to NAND gate 144 are receiving input signals, the output signal of NAND gate 144 to inverting amplifier 120 is removed, allowing an enabling signal to appear in conductor 112. With a signal in enabling conductor 112, the firing circuits 45 may fire controlled rectifier bridge 42 in accordance with the regulating signal 300 in control circuit 30. As controlled rectifiers 421 through 426 are fired, current will again begin to flow in alternating current supply lines 21, 22 and 23. This current when sensed in current transformer 96 removes the output signal of inverting amplifier 102 to NAND gate 116, preventing further operation of enabling circuit 32.

If during the period of the time delay of delay circuit 104, the current in alternating current supply lines 21, 22, and 23 does not remain continually at zero, that is, if some current is sensed by current transformer 96 indicating that rectifier bridges 42 and 44 cannot be switched, a signal will appear at the input of inverting amplifier 102. This will remove the output signal of that amplifier and one of the input signals to NAND gate 116 causing an output signal to issue from that gate which, through the associated NAND gates 117, 121, 123, and 125 will cause NAND gate 127 to remain in its original state regardless of the subsequent operation of timer 104. It will also cause a signal to issue from NAND gate 159 to NAND gates 142 and 144 which will cause the former gate to supply an enabling signal in conductor 110 so that firing circuit 44 may fire controlled rectifiers 401 to 406 to dissipate the current. The signal from NAND gate 125 to AND gate 156 and the signal from NAND gate 116 to AND gate 156 cause the output of NOR gate 158 to be removed. This removed signal, when supplied to NAND gate 116, disables NAND gate 116 and prevents further operation of enabling circuit 32 until delay circuit 104 has timed out. When this occurs, the output of NAND gate 125 is again removed which causes NOR gate 158 of delay reset circuit 107 to provide an output signal to NAND gate 116 which allows the delay circuit to be operated the next time a proper signal issues from inverting amplifier 102 indicating that there is no current through load 28.

When the current in alternating current supply lines 21, 22, and 23 again falls to zero, the operation of delay circuit 104 will again commence, and if the current stays at zero for the period of delay circuit 104, the above described operation of enabling circuit 32 may proceed.

A similar operation occurs to prevent faulty operation of enabling circuit 32 in the event that the polarity signals in conductors 92 and 94 are reversed prior to the resetting of delay circuit 104.

The operation of enabling circuit 32 to switch from rectifier bridge 42 back to rectifier bridge 40 is analogous to the operation of enabling circuit 32 described above.

*Residual firing signal delay circuit*

Figure 11:
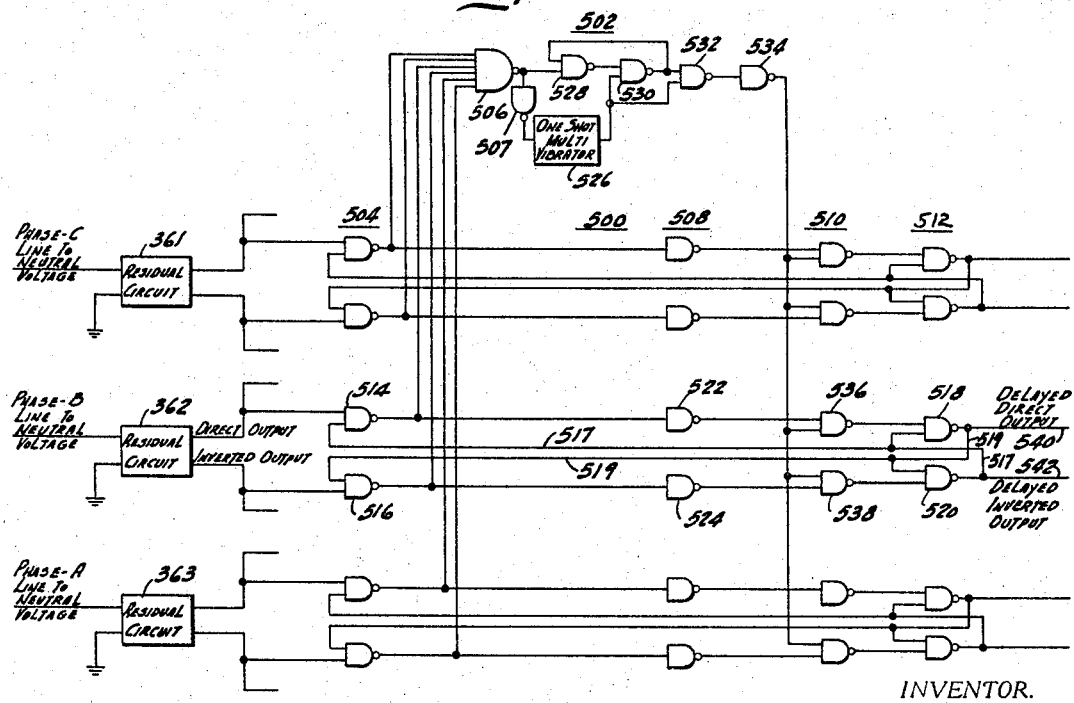
FIGURE 11 is a detailed schematic diagram of a residual firing signal delay circuit which may be utilized in the control circuit of the present invention.

Instead of providing a delay circuit 64 in each of residual circuits 361, 362, and 363 to generate the required residual firing signals a separate circuit generating the signals for all such firing circuits may be employed. FIGURE 11 shows a circuit 500 which contains a single delay circuit 502. The circuit 500 is operated by residual circuits 36 which detect when the line to neutral voltage of phases A, B, and C changes polarity. The residual circuits 361, 362, and 363 may, as above, comprise differential amplifiers having a pair of outputs, one of which provides a signal for each polarity of the line to neutral voltage. These output signals are connected to a bank of input NAND gates 504 which are connected to NAND gate 506, which operates delay circuit 502, and to inverting NAND gates 508. Delay circuit 502 and inverting NAND gates 508 are both connected to output NAND gates 510, which in turn are connected to flip-flop 512 which provides mutually exclusive output signals. However, the operation of flip-flop 512 is delayed by the amount of the time delay in delay circuit 502 after the line to neutral voltage in the AC supply lines 21, 22, and 23 goes through zero. The output signals from flip-flop 512 are supplied to the appropriate firing circuits to insure that those circuits generate a firing signal during the latter part of the time interval during which the controlled rectifier connected to the firing circuit may be rendered conductive.

*Residual firing signal delay circuit—construction*

The specific details of the construction of circuit 500 is explained below in connection with residual circuit 362 which supplies residual firing signals to firing circuit 442 to fire thyristor 402. One of the two outputs from residual circuit 362 is supplied to each of NAND gates 514 and 516. For example, the direct output of residual circuit 362 may be connected to NAND gate 514 while the inverted output is connected to NAND gate 516. These NAND gates also receive an input signal from NAND gates 518 and 520 which form one of the flip-flops 512 via conductors 517 and 519. The output of both NAND gates 514 and 516 is supplied to NAND gate 506 which controls the operation of delay circuit 502. The output of NAND gate 514 is also supplied to inverting NAND gate 522 while the output of NAND gate 516 is supplied to inverting NAND gate 524.

Delay circuit 502 includes the aforementioned NAND gate 506, NAND gate 507, and a one-shot multivibrator 526 which normally provides an output signal but does not provide an output signal for a certain time period when an input signal is provided thereto. The output of NAND gate 506 is supplied to NAND gate 528. The output of NAND gate 528 is supplied to NAND gate 530 which also receives an input signal from multivibrator 526. NAND gate 530 provides an output to NAND gate 528 and to NAND gate 532. The latter NAND gate also receives an input signal from multivibrator 526. The output of NAND gate 532 is provided to NAND gate 534 and hence, to output NAND gates 510.

Output NAND gate 536 is provided with the aforementioned input signals from NAND gate 534 and a signal from inverting NAND gate 522. Output NAND gate 538 is provided with a signal from NAND gate 534 and a signal from inverting NAND gate 524.

The output from output NAND gates 536 and 538 is provided to the flip-flop 512 comprised of NAND gates 518 and 520. As previously described, flip-flops 512 are so termed because of their bistable nature in which they provide an output signal in one of their inputs to the exclusion of a signal in the other of their inputs in response to one input signal and perform the reverse operation in response to a second input signal. A circuit having the bistable nature of a flip-flop may be formed of two parallel NAND gates, such as NAND gates 518 and 520, the output of each NAND gate being provided to the input of the other so that the lack of an output signal from one NAND gate insures and output signal from the other and vice versa.

The output signal of NAND gates 518 in conductor 540 corresponds to the direct output of residual circuit 362 except that the appearance of an output signal from NAND gate 518 in respone to the appearance of a signal from the direct output of residual circuit 362 is delayed by the amount of the time delay circuit 502. Similarly the output signal of NAND gate 520 in conductor 542 corresponds to the inverted output of residual circuit 362 except that the appearance of an output signal from NAND gate 520 in response to the appearance of a signal from the inverted output of residual circuit 362 is delayed by the amount of the time delay of delay circuit 502.

As may be seen from FIGURE 11, the remaining elements of circuit 500 are connected in a similar manner to the elements described above in detail.

*Residual firing signal delay circuit—operation*

The operation of circuit 500 is as follows and will be explained in connection with residual circuit 362 which provides a signal to firing circuit 442 to fire controlled rectified 402. Just prior to the time the polarity of the line to neutral voltage of phase B changes from positive to negative, the direct output of residual circuit 362 connected to NAND gate 514 contains an output signal while the inverted output of residual circuit 362 connected to NAND gate 516 contains no output signal. Assuming any previous operation of delay circuit 502 has been completed, there will be a signal in conductor 540 which corresponds to the signal in the direct output of residual circuit 362. There will be no signal in conductor 542. This corresponds with the lack of an output signal in the inverted output of residual circuit 362.

The signal in the direct output of residual circuit 362 is provided to NAND gate 514 while no signal is supplied to NAND gate 516 via the inverted output of residual circuit 362. NAND gate 516 does, however, receive the signal in conductor 519 from NAND gate 518. NAND gate 520 provides no input signal to NAND gate 514 via conductor 517. As each of NAND gates 514 and 516 receive only one input signal, they both provide output signals to NAND gate 506 of delay circuit 502 and to inverting NAND gates 522 and 542, respectively. While not described in detail, it may be stated that a detailed analysis will reveal that at this point all of the other input NAND gates 504 are supplying input signals to NAND gate 506 so that that element provides no output signal to NAND gate 507 or the remainder of delay circuit 502.

The signals to NAND gates 522 and 524 from NAND gates 514 and 516 are inverted by these gates so that no output signals issue therefrom to NAND gate 536 and NAND gate 538, respectively. Also, at this point there is no output signal from delay circuit 502. As NAND gates 536 and 538 receive no input signals to either of their inputs, they provide an output signal to NAND gates 518 and 520, respectively. NAND gate 518 is provided with the input signal from NAND gate 536 only, there being no signal in conductor 517 or the output NAND gate 520. Thus, an output signal from NAND gate 518 is provided to conductor 540. The presence of this output signal is assured by the absence of a signal in conductor 517 which is connected to the input of NAND gate 518.

When the polarity of the phase B line to neutral voltage reverses, that is, when it goes from positive to negative, the output signal in the direct output of residual circuit 362 is removed and an output signal is supplied to the inverse output of the residual circuits. Referring to FIGURE 6, this will occur at time $T_6$. The presence of an output signal in the inverse output of the residual circuit 362 provides two input signals to NAND gate 516 and removes the output signal from that element. This removes the input signal to NAND gate 524 and causes that gate to provides an output signal to NAND gate 538. The removal of the output signal from NAND gate 516 removes one of the output signals to NAND gate 506 and causes that gate to issue an output signal. This output signal energizes multivibrator 526 through NAND gate 507 and causes it to lose its output signal for the period of its time delay. The output signal from NAND gate 506 is also supplied to NAND gate 528 to remove the output signal of that gate. Multivibrator 526 does not provide a signal to NAND gate 530. NAND gate 530 provides an output signal to NAND gate 532. NAND gate 532, receiving no input signal from multivibrator 526, continues to provide an output signal which prevents a signal issuing from NAND gate 534. The output signal from NAND gate 530 is supplied to the input of NAND gate 528 to insure that the latter gate does not provide an output signal.

The input signals to output NAND gates 510 remain the same with the exception of an input signal to NAND gate 538 from inverting NAND gate 524. The output signal from these elements also remains the same as does the output signal from NAND gate 518 and 520 to conductors 540 and 542, respectively, and no residual firing signal to firing circuit 442 is generated in conductor 540.

These conditions remain for the amount of the time delay of multivibrator 526. At the end of this time interval, multivibrator 526 again supplies an output signal to NAND gates 530 and 532. The output signal to NAND gate 532 removes the output signal from that gate and causes NAND gate 534 to provide an output signal therefrom to output NAND gates 536 and 538. Output NAND gate 538 now has input signals to both of its inputs and, therefore, provides no output signal. Output NAND gate 536 only has one input signal and hence, continues to provide an output signal. The lack of an output signal from output NAND gate 538 to NAND gate 520 causes the latter gate to provide an output signal for the first time to conductor 542. This output signal is immediately supplied to the input of NAND gate 518, via conductor 519, so that that gate receives input signals to both its inputs, one such signal coming from NAND gate 536, the other such signal coming from NAND gate 520. This removes the output signal of NAND gate 518 and the signal in conductor 540. The loss of the signal in conductor 540 is supplied to NAND gate 62 of firing circuit 442 shown in FIGURE 5 to fire controlled rectifier 402 15 electrical degrees before the end of its conductive interval.

The removal of the output signal from NAND gate 518 removes one of the input signals to NAND gate 516, as the two are connected by conductor 519. This restores the output of NAND gate 516 which, when supplied to NAND gate 506, removes the output of that gate. The removal of the output signal of NAND gate 506 causes NAND gate 528 to again supply an output signal, which along with the restored output signal of multivibrator 526 removes the output of NAND gate 530. As the output of NAND gate 530 is connected to the input of NAND gate 528, the lack of an output signal from NAND gate 530 insures that an output signal will continue to issue from NAND gate 528. The lack of an output signal from NAND gate 530 also provides an output signal from NAND gate 532, which removes the output signal of NAND gate 534 to output NAND gates 536 and 538 and readies delay circuit 502 for a subsequent operation of circuit 500.

FIGURES 12 and 13 show another embodiment of firing circuits 44 and the associated circuitry. Insofar as possible, identical elements have been given the same designations as in FIGURE 5.

*Commutation notches*

Since regulator circuits 38 are operated by the instantaneous line to line voltages supplied by line signal transformer 29, the regulator circuits 38 will operate the firing circuits 44 to provide a firing signal to the controlled rectifiers 401 to 406 any time the instantaneous line to line voltage is less than regulating signal 300, assuming always that permit to fire circuits 34 have released firing circuits 44 to allow them to operate.

Figure 8:
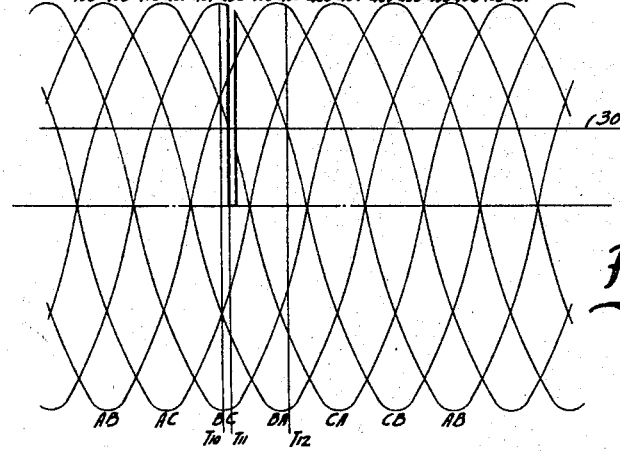
FIGURE 8 is a graph showing the line to line voltages present in the three-phase alternating current power applied to the electrical control circuit and in particular the commutation notches in the line to line voltages caused by the operation of the controlled rectifiers of the circuit.

It will be noted that during commutation between controlled rectifiers, there will be a period of time when two rectifiers will be in the conducting state and will have either their anodes or their cathodes connected to the same direct current bus. This produces a short between these two rectifiers which is actually a line to line short, termed a "commutation notch," which will cause the instantaneous line to line voltage to be less than the reference signal 300 and may cause faulty operation of control circuit 20 unless provision is made to prevent such faulty operation. For example, prior to time $T_{10}$ in FIGURE 8, controlled rectifiers 405 and 406 are conducting phase B to phase A line to line voltage to positive direct current bus 24, load 28, and negative direct current bus 46. At time $T_{10}$ permit to fire circuit 342 will provide a permit to fire signal to firing circuit 442 for controlled rectifier 402, which rectifier conducts the phase B line to neutral voltage to the positive direct current bus 24. This means that anytime the phase C to phase B line to line voltage falls below regulating signal 300, controlled rectifier 402 will be rendered conductive. At time $T_{11}$, the previous controlled rectifier, controlled rectifier 401, is fired on by firing circuit 441 as the phase C to phase A line to line voltage becomes less than the regulating signal 300. As both controlled rectifier 405 and controlled rectifier 401 are now on, alternating current supply line 23, containing the phase C voltage is shorted to alternating current supply line 22 containing the phase B voltage through negative direct current bus 26, until controlled rectifier 405 is commutated off. Because of this short circuit, the phase C to phase B line to line voltage collapses and falls below regulating signal 300. This would normally cause regulator circuit 382 to generate a firing signal to controlled rectifier 402 through firing circuit 442 and would give a false output in that controlled rectifier 402 would commence conduction at time $T_{11}$ rather than time $T_{12}$.

To overcome this problem, the embodiment of the firing circuits 44 shown in FIGURE 13 requires that the commutation notch in the line to line voltage, caused by the firing of one of the controlled rectifiers, appear and then disappear before a subsequent firing circuit may be operated. If the commutation notch does not occur, the operation of control circuit 20 is not affected. However, if the commutation notch does appear, it must then disappear before the operation of a subsequent firing circuit 44 will be permitted. Protection against false operation due to commutation notches is provided to firing circuits 44A, shown in FIGURE 13 by the use of timing circuit 600 shown in FIGURE 12. Extremely rapid changes in regulating signal 300 may, under certain circumstances, cause a similar faulty operation of firing circuits 44. Timing circuit 600 also protects against this.

Timing circuit 600 controls the sequential operation of the firing circuits 44A, as for example the operation of firing circuit 442A to fire controlled rectifiers 402 and 401, followed by the operation of firing circuit 443A to fire controlled rectifiers 403 and 402, so that a sufficient time elapses between the operation of one firing circuit and the operation of the subsequent firing circuit to prevent all line voltage commutation notches to disappear prior to the time the operation of the subsequent firing circuit occurs. This prevents the commutation notches from interfering with the operation of control circuit 20. The elapsed time includes a basic time delay which is sufficient, under most conditions, to permit all commutation notches to disappear. Additionally, however, if the commutation notches have not actually disappeared at the end of this time delay, the operation of the subsequent firing circuit is prevented until all the commutation notches have, in fact, disappeared. This insures that the operation of the firing circuits will not be affected by commutation notches.

Timing circuit 600 also prevents extremely rapid increases in regulating signal 300 from causing faulty operation of the control. Such rapidly increased regulating signals may call for such a speeded-up sequential operation of firing circuits 44A that the operation of control circuit 20 may be, under certain circumstances, affected. Timing circuit 600 provides a limit to the rate at which the sequential operation of firing circuit 44A may be performed and prevents any faulty operation due to regulating signal demands for an increased sequential switching rate.

Further, the operation of firing circuits 44A shown in FIGURE 13 is such that not only can a firing circuit only be sequentially operated up to a given maximum rate, but also that the firing circuits may be operated only in a certain predetermined operative sequence. Thus, the subsequent operation of firing circuit 443A can only follow, after the time delay of circuit 600, the operation of firing circuit 442A, which in turn can only follow the operation of firing circuit 44A. This prevents faulty operation of firing circuit 44A from any source that would tend to disturb the switching sequence. A circuit having a switching sequence such as firing circuit 44A is termed a "ring counter" because of the analogy of its repetitive, sequential, and endless operation to the endlessness of a ring or annulus. Hence, firing circuit 44A is termed a ring counter firing circuit.

Time circuit—construction

The operation of firing circuit 44A is controlled by timing circuit 600, shown in FIGURE 12, which controls the firing circuits during start up and throughout the entire range of operation.

Timing circuit 600 includes an input NAND gate 602 which receives an input signal from resistor-capacitor circuit 604. Resistor-capacitor circuit 604 is energized by a voltage source connected to terminal 605. NAND gate 602 receives another input from NAND gate 606, one input of which is connected to the output of NAND gate 602. The other input to NAND gate 606 is connected to conductor 608. This conductor provides an input signal to NAND gate 606 only when one of the firing circuits 44A is generating a firing signal to one of the controlled rectifiers. The input signal in conductor 608 is also supplied to NAND gate 610. The other input signal to NAND gate 610 is the output from NAND gate 606.

The output of NAND gate 610 operates multi-vibrator 612 to remove the output signal of the multi-vibrator after a given time period, for example, .03 millisecond. The delayed operation of multi-vibrator 612 may, for example, be provided by input capacitor 613. At the end of the .03 millisecond interval, the output signal of multi-vibrator 612 is removed from NAND gate 602 and NAND gate 614 for another time period, for example, .2 millisecond.

Conductor 616 is connected to the alternating current supply lines 21, 22, and 23 so as to supply a signal to NAND gate 618 when a commutation notch appears in the lines. Specifically, a plurality of non-saturable current transformers 603 are coupled to the alternating current supply lines 21, 22, and 23 to rectifier bridge 40. These current transformers are connected in series through rectifier bridges 607. One terminal of the series connected rectifier bridges 607 is connected to conductor 616 while the other terminal is grounded. Current transformers 603 measure the rate of change of the current flowing in alternating current supply lines 21, 22, and 23 to rectifier bridge 40. During the short circuiting occurring during commutation, the line current will change sharply and will cause transformers 603 to produce a spiked signal in conductor 616. During normal operation, the current will change slowly and will cause only a slightly increased signal. A limiting circuit 617, such as a Schmitt trigger circuit or a plurality of series connected diodes, may be included in conductor 616 to insure that only the spiked signals caused by the commutation notches are supplied to NAND gate 618.

The output of NAND gate 618 is connected to NAND gate 620 which also receives the output from NAND gate 614. The output of NAND gate 620 is supplied to NAND gate 622 as well as to NAND gate 624. NAND gate 624 receives an input signal from NAND gate 602 and supplies an output signal to NAND gate 620. The output of NAND gate 622 is supplied, via conductor 626, to the firing circuits to permit them to generate firing signals.

Timing circuit—operation

In operation, when control circuit 20 is energized, timing circuit 600 is also energized. As none of the controlled rectifiers will be firing, no signal will appear in conductor 608 to the inputs of NAND gates 606 and 610. This will cause an output signal to issue from the latter element which operates multi-vibrator 612 to cause an output signal to issue therefrom. The output signal of multi-vibrator 612 is supplied to NAND gate 602, as is the output signal of NAND gate 606.

The third input signal to NAND gate 602 is the signal from resistor-capacitor circuit 604. Up to the time the capacitor in the circuit is completely charged by the voltage supplied at terminal 605, the input to circuit 604 will be shorted to ground across the capacitor and no signal will be applied to the input of NAND gate 602. This will cause an output signal to issue therefrom which will be supplied to the input of NAND gate 602 and NAND gate 614.

As NAND gate 614 has two input signals applied to it, no output signal will issue from it to NAND gate 620. As there is no commutation notches in the line voltage, none of the rectifiers in rectifier bridge 40 being fired, there will be no input signal to NAND gate 618 from that conductor and an output signal will issue from it to the NAND gate 620. NAND gate 620 will issue an output signal which is supplied to NAND gate 624, along with the output signal of NAND gate 602, to remove the output signal from NAND gate 624 to NAND gate 620. The output signal from NAND gate 620 is also supplied to NAND gate 622 which prevents an output signal from issuing from that gate to conductor 626. The absence of a signal in conductor 626 to the firing circuits 44A prevents all these firing circuits from operating.

At the end of approximately .7 millisecond, the capacitor in resistor-capacitor circuit 604 will become charged. This will prevent a voltage signal being applied to the capacitor from being shorted to ground and will apply the voltage signal to the input of NAND gate 602. As NAND gate 602 has an input signal to each of its inputs, its output signal will be removed. This will remove an input signal to NAND gate 614 and will cause that element to generate an output signal to NAND gate 620. Removal of the output signal from NAND gate 602 will also remove one of the input signals to NAND gate 624 and will cause that element to supply a signal to NAND gate 620. As all of the inputs to NAND gate 620 now contain input signals, the output signal therefrom will be removed which will cause NAND gate 622 to issue an output signal in conductor 626 to firing circuits 44A. This signal will permit the firing circuits to generate a firing signal to the controlled rectifiers and rectifier bridge 40 when the appropriate regulating signals are applied as hereinafter described.

The .7 millisecond time delay provided by resistor-capacitor circuit 604 corresponds to 15 electrical degrees of the alternating current power supply and delays energization of the firing circuits 44A for a sufficient period of time to permit all the necessary line to neutral and line to line voltages to be applied to the firing circuits before operation of the control circuit 20 may begin. This insures correct, reliable operation of control circuit 20.

Ring counter firing circuit—construction

Figure 10:
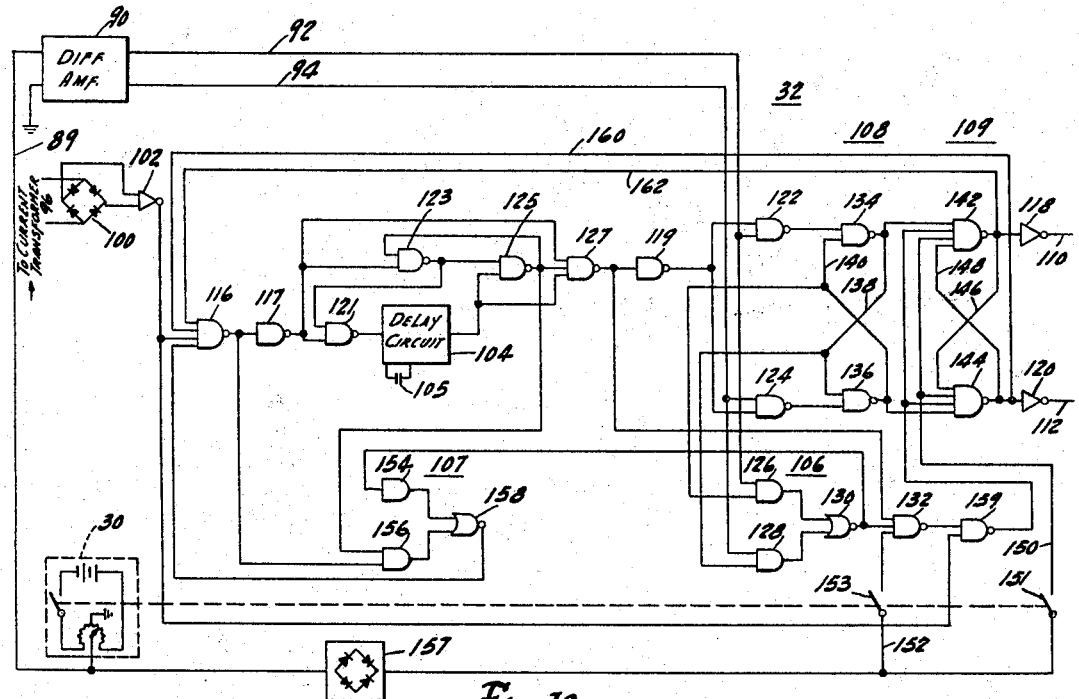
FIGURE 10 is a detailed schematic diagram of an enabling circuit employed in the electrical control circuit of FIGURE 9 to select the desired polarity of the direct current output.

FIGURE 13 shows an embodiment of firing circuits 44a which may be utilized with timing circuit 600 to operate rectifier bridge 40. With the appropriate signals from an enabling circuit, such as shown in FIGURE 10, and from an input circuit 700, as shown in FIGURE 14, the firing circuits 44a may also be used to operate the second rectifier bridge 42, as hereinafter described, to provide direct current power of the opposite polarity to buses 24 and 26. This eliminates the necessity for the second set of firing circuits 45 included in the bi-polarity control shown in FIGURE 9.

Referring again to firing circuit 442 which provides firing signals to controlled rectifier 402 and rectifier bridge 40, the present embodiment of the firing circuit is shown in FIGURE 13 by a numeral 442A. Similar to firing circuit 442, firing circuit 442A contains a NAND gate 66 and a NAND gate 68, the output of the latter being connected to the input of the former, and vice versa. NAND gate 66 also receives the inverted input from permit to fire circuit 442. NAND gate 68 receives the direct input from residual circuit 362 through delay circuit 64. In the alternative, residual firing signal delay circuit 500, shown in FIGURE 11, may be utilized. In such a case, conductor 542 is connected to the input of NAND gate 68.

The third input to NAND gate 68 is supplied by input NAND gate 640. Input NAND gate 640 receives an input signal from firing circuit 441A which provides firing signals to the preceding controlled rectifier in rectifier bridge 40, that is controlled rectifier 401. This input signal from firing circuit 441A is provided to input NAND gate 640 through NAND gate 660. NAND gate 640 also receives an input from input circuit 700 which controls the instant of firing signal generation, and an input from conductor 626 of timing circuit 600 which controls the overall operation of firing circuit 442A.

The output of NAND gate 66 is supplied to the input of NAND gate 644 and to firing circuit 441A. NAND gate 644 supplies an output signal to blocking NAND gate 646 and to output NAND gate 648. Blocking NAND gate 646 is so termed because it supplies output signals to output NAND gate 648 to remove the firing signal to the controlled rectifiers when the firing circuit 442A receives a signal that the controlled rectifier has, in fact, been rendered conductive and also blocks the operation of firing circuit 443A by means of an output signal to NAND gate 660 when firing circuit 442A is providing a firing signal to controlled rectifiers 402 and 401. Blocking NAND gate 646 receives an input signal from NAND gate 650 which, in turn, receives input signals from conductor 626 and blocking NAND gate 646. Output NAND gate 648 also receives an input signal from NAND gate 66 of firing circuit 443A, as does blocking NAND gate 646. This input signal prevents firing circuit 442A from becoming operative while firing circuit 443A is providing a firing signal. Such an inter-connection insures that firing circuits 44A will operate in the desired ring counter manner.

The output of output NAND gate 648 is supplied to NAND gate 652 and to NAND gate 74. NAND gate 652 receives an input from each of the firing circuits 44A and provides an output signal in conductor 608 to timing circuit 600 whenever one of the firing circuits 44A is providing a firing signal to one of the controlled rectifiers in rectifier bridge 40. NAND gate 74 provides an output to NAND gates 76 and 75. The other input to each of these NAND gates is a signal from one of the enabling conductors 110 or 112. Specifically, NAND gate 76 receives an input signal from conductor 110 while NAND gate 76 receives an input signal from conductor 112. The output of NAND gate 76 is supplied to inverting amplifier 78, while the output of NAND gate 658 is supplied to inverting amplifier 77. The outputs of each of inverting amplifiers 78 and 77 are connected to a firing signal generation means such as transistor 79, transformers 80 and 85, add diode bridge 82, shown in FIGURE 7 which are in turn connected to one controlled rectifier in each of the rectifier bridges. For example, inverting amplifier 78 may be connected to controlled rectifier 402 in rectifier bridge 40 while inverting amplifier 77 is connected to controlled rectifier 425 in rectifier bridge 42. It will be noted that both these rectifiers connect the B phase in alternating current supply line 22 to the direct current bus that will carry the positive direct current to load 28. See Tables I and II.

In order that the correct regulating signal will be supplied to firing circuit 442A to cause it to properly fire either controlled rectifier 402 or controlled rectifier 425, input circuit 700 is provided which permits the signal from regulator circuit 382 or the signal from regulator circuit 385 to be supplied to input NAND gate 640 at the proper time, depending on which rectifier is to be fired.

Input circuit 700 includes two sets of parallel connected AND gates. One set is comprised of AND gates 702 and AND gates 704. The other set is comprised of AND gates 706 and 708. The inputs to AND gate 702 comprise the inverted output of the differential amplifier comprising regulator circuit 382 and a signal from enabling conductor 110. The inputs to AND gate 704 comprise the direct output of the differential amplifier comprising regulator circuit 385 and a signal from enabling conductor 112. The outputs of AND gates 702 and 704 is supplied to NOR gate 710 and the output of NOR gate 710 supplied to NAND gate 712. The output of NAND gate 712 forms the input signal to input NAND gate 640 of firing circuit 442A.

AND gates 706 and 708 are connected in an analogous manner to regulator circuits 382 and 385, enabling conductors 110 and 112, NOR gate 714, and NAND gate 716 to provide firing signals to firing circuit 445A to fire either controlled rectifier 405 or rectifier bridge 40 or controlled rectifier bridge 422 of rectifier bridge 42.

*Ring counter firing circuit—operation*

The operation of firing circuit 442A is as follows. During startup, at the end of the .7 millisecond time delay of timing circuit 600, generated by resistor-capacitor circuit 604, an input signal will be supplied to input NAND gate 640 of the firing circuit and to NAND gate 650 via conductor 626. As NAND gate 640 does not receive an input signal from the direct output of regulator circuit 382 or from firing circuit 441A, an output signal issues from that NAND gate which is supplied to NAND gate 68. NAND gate 68 receives the direct output from residual circuit 362.

NAND gate 66 receives the inverted output from permit to fire circuits 342, which during start-up, lacks an output signal. This causes an output signal to issue from NAND gate 66 which is supplied to NAND gate 66 which is supplied to NAND gates 68 and 644. The input from NAND gate 66, along with the input signal from residual circuit 362, and the signal from input NAND gate 640 removes the output signal from NAND gate 68 and assures that an output signal will continue to issue from NAND gate 66. The signal from NAND gate 66 is supplied to firing circuit 441A. As firing circuit 442A is not operative, this signal will allow firing circuit 441A to become operative before firing circuit 442A becomes operative.

The output signal from NAND gate 66 to NAND gate 644 removes the output signal of that element and causes output NAND gate 648 to issue an output signal to NAND gates 652 and 74. The output signal to NAND gate 74 removes the output signal of that element to NAND gate 76, causing the latter gate to issue a signal to inverting amplifier 78 which inverts the signal and prevents generation of firing signals to controlled rectifier 402.

A detailed study of the firing circuits 44A would reveal that as none of the firing circuits 44A are operative at this point, each of them are providing an output signal to NAND gate 52 so that the output signal of that element in conductor 608 is removed.

Input circuit 700 is operable by the signal in enabling conductors 110 and 112, and by the output signals of regulator circuits 382 and 385, to supply the regulating input signals to the input NAND gates 640 of firing circuits 442A and 445A at the proper point. Specifically referring to firing circuit 442A, by way of example, at $T_2$ in FIGURE 6, the phase C to phase B line to line voltage will be positive with respect to regulating signal 300. This will cause an output signal to issue from the direct output of regulator circuit 382 and no output to issue from the inverted output. At the same time, the phase B to phase C line to line voltage will be negative with respect to regulating signal 300. This will cause an output signal to issue from the inverse output of regular circuit 385 and no output signal to issue from the direct output. Assuming it is desired to fire controlled rectifier 402 in rectifier bridge 40, a signal will be supplied by enabling circuit 32 to enabling conductor 110 and no signal will be supplied to enabling conductor 112. AND gate 702 will thus receive an input signal from enabling conductor 110 but no signal from the inverted output of regulator circuit 382. No output signal will issue from AND gate 702 to NOR gate 710. AND gate 704 will receive no input signal from enabling conductor 112 or from the direct output of regulator circuit 385. No output signal will issue from that element to NOR gate 710. This will cause NOR gate 710 to issue an output signal to NAND 712 which will prevent an output signal from issuing to input NAND gate 640 of firing circuit 442A.

When the regulating signal 300 becomes more positive than the phase C to phase B line to line voltage, thus reversing the polarity of the input signals to regulator circuit 382, a signal is provided at the inverted output of the regulating circuit but not at the direct output. This will occur at time $T_3$ in FIGURE 6. The signal in the inverted output will be supplied to AND gate 702 and, along with the signal from enabling conductor 110 will cause AND gate 702 to issue an output signal to NOR gate 710 to remove the output signal of that element to NAND gate 712. This will cause NAND gate 712 to issue an output signal to input NAND gate 640 of firing circuit 442A.

At time $T_2$, in FIGURE 6, permit to fire circuit 342 will be operated by the phase A line to neutral voltage to supply a signal to NAND gate 66. This will place the firing circuit 442A in a condition to generate firing signals to controlled rectifiers 402 and 401 in accordance with the appropriate signal from regulator circuit 382 or residual circuit 362.

Either before or after time $T_2$, the preceding controlled rectifier 401 will be fired on. Once this occurs firing circuit 442A may be prepared to become the next firing circuit to be rendered operative in the operative sequence. To this end, the generation of a firing signal by firing circuit 441A causes an output signal to be generated by NAND gate 660 of that circuit which is supplied to input NAND gate 640. The signal from NAND gate 660 of firing circuit 441A to input NAND gate 640 will allow firing circuit 442A to commence operation any time the appropriate regulating signal 300 is received.

When the regulating signal 300 becomes more positive than the phase C to phase B line to line voltage, a third input signal from input circuit 700 is supplied to input NAND gate 640 to remove the output of that gate. This removes one of the input signals to NAND 68 which, in turn, supplies an output signal to NAND gate 66 to remove the output signal of that gate. The removal of the output signal of NAND gate 66 removes the input signal to NAND gate 644 and causes that gate to issue an output signal to blocking NAND gate 646 and output NAND gate 648. NAND gate 646 receives no input signal from NAND gate 650, as that gate is receiving input signals from both conductor 626 and the output of blocking NAND gate 646. This will insure that NAND gate 646 will assume the unblocked state and will continue to issue a signal to NAND gate 648. Output NAND gate 648 also receives the necessary signal from NAND gate 66 of firing circuit 443A to permit firing circuit 442A to become operative prior to firing circuit 443A becoming operative. Blocking NAND gate 646 also receives this signal. Blocking NAND gate 646 supplies an output signal to NAND gate 660 of firing circuit 442A which removes the output of that element to input NAND gate 640 of firing circuit 443A. This prevents firing circuit 443A from becoming operative until after firing circuit 442A has completed its generation of firing signals.

As all the inputs to output NAND gate 648 now contain an input signal, the output signal from NAND gate 648 is removed. This removes the input signal to NAND gate 74 and causes that gate to issue an output signal to NAND gate 76. NAND gate 76 also receives an input signal from enabling conductor 110 so that the output of inverting amplifier 78 is removed. This allows inverting amplifier 78 to generate a firing signal to controlled rectifier 402. As there is no signal in enabling conductor 112, the output of NAND gate 75 is unaffected.

The removal of the output signal from output NAND gate 648 is supplied via conductor 654 to NAND gate 74 of firing circuit 441A. This causes that gate to reapply a firing signal to controlled rectifier 401 to insure that that rectifier is promptly rendered conductive so that phase C to phase B line to line voltage is conducted through positive direct current bus 24, load 28, and negative direct current bus 26.

The removal of the output from NAND gate 648 also removes one of the input signals to NAND gate 652 and causes that element to generate a signal in conductor 608. The signal in conductor 608 is supplied to NAND gate 610 of timing circuit 600 to remove the output of that gate. After a .03 millisecond time delay, which provides a sufficient interval of time for the discharge or recharging of any capacitors or other elements in the circuit, multivibrator 612 is operated to remove the output signal therefrom. The output signal of multivibrator 612 is removed for approximately .2 millisecond, which is the maximum time interval during which a firing signal is applied to the gate terminal of controlled rectifier 402 as hereinafter described.

At the end of the .2 millisecond, multivibrator 612 reverts to its original state of supplying an output signal. The output signal of multivibrator 612 is supplied to NAND gate 602 and to NAND gate 614. The output signal to NAND gate 602 does not effect the output signal of that element. However, as NAND gate 614 is receiving an input signal from both NAND gates 602 and multivibrator 612, its output signal is removed. This removes one of the input signals to NAND gate 620 and causes that gate to issue an output signal to NAND gates 624 and 622. The output signal to NAND gate 624 removes the output signal of that element to NAND gate 620 and insures that NAND gate 620 will continue to supply an output signal to NAND gate 622. The output signal to NAND gate 622 removes the output signal of that element to conductor 626. The removed output signal in conductor 626 is provided to firing circuit 442A to remove one of the input signals to NAND gate 640. As conductor 626 is also connected to NAND gate 650, the removed output signal in the conductor will be supplied to that gate and will supply an output signal from that gate to blocking NAND gate 646. As blocking NAND gate 646 has an input signal supplied to each of its three inputs, the output signal therefrom to output NAND gate 648 will be removed, causing output NAND gate 648 to issue an output signal to NAND gate 74. The output of NAND gate 74 is removed, which causes NAND gates 76 and 75 to supply an output signal to inverting amplifiers 78 and 77. This blocks the firing signal supplied by inverting amplifier 78 to the gate terminal of controlled rectifier 402 .23 millisecond after the firing signal was generated by 442A. The removed output signal from blocking NAND gate 646 is supplied to NAND gate 660 which causes that gate to provide a signal to input NAND gate 640 of firing circuit 443A to allow that firing circuit to become the next one which will be rendered sequentially operable. The removed output signal from NAND gate 646 is also supplied to NAND gate 650 to insure that that element continues to issue a signal to blocking NAND gate 642 even when the signal in conductor 626 is reapplied.

It may be noted that firing circuit 442A is closed immediately after a firing signal is generated by it. Specifically, when the output of NAND gate 66 is removed, this is supplied to blocking NAND gate 646 of firing circuit 441A. This causes that circuit to issue an output signal to NAND gate 660 which removes the output signal therefrom to input NAND gate 640. This removed output signal causes input NAND gate 640 to issue an output signal to NAND gate 68 but causes no further operation of firing circuit 442A. The removed output signal from blocking NAND gate 646 of firing circuit 441A blocks NAND gate 640 so that other input signals thereto are ineffective to cause operation of that NAND gate or of firing circuit 442A.

The output signal of output NAND gate 648 which is supplied to NAND gate 74 to remove the firing signal to the gate terminal of controlled rectifier 402 is also supplied to NAND gate 652 and removes the output of that gate in conductor 608 to NAND gate 606 of timing circuit 600. This removes one of the inputs to NAND gate 606 and causes that gate to issue an output signal to NAND gate 602. The output signal of NAND gate 602 removes the output signal from that element to NAND gate 606 and causes NAND gate 606 to continue to issue an output signal to NAND gate 602. Further, the removed output signal from NAND gate 602 is supplied to NAND gate 614 which causes that gate to issue an output signal to NAND gate 620. As the removed output signal from NAND gate 602 is also supplied to the input of NAND gate 624 to cause that gate to issue an output signal to NAND gate 620, all of the inputs to NAND gate 620 have input signals applied thereto and the output signal of this element to NAND gate 622 is removed to cause that gate to reissue a firing signal in conductor 626. This signal is supplied to input NAND gate 640 of firing circuit 443A to render that operative in accordance with regulating signal 300.

The manner in which firing circuit 44A is operated in endless, or sequential or ring counter fashion is to be particularly noted. Considering in detail the succession from firing circuit 442A to firing circuit 443A when the signal in conductor 626 is removed by timing circuit 600 to cause the firing signal to the gate terminal of controlled rectifier 402 to be removed, one of the inputs to NAND gate 650 is removed, causing that gate to issue a signal to blocking NAND gate 646. This causes an input signal to be supplied to all of the inputs of blocking NAND gate 646 and removes the output signal of that gate to NAND gate 650 and NAND gate 660. This signal removal causes the latter gate to supply an output signal to input NAND gate 640 of firing circuit 443A. However, at that time the input NAND gate 640 of firing circuit 443A is rendered inoperative by the lack of a signal in conductor 626 and thus, no further operation of firing circuit 443A may occur. When the signal in conductor 626 is again supplied, indicating that the firing of controlled rectifier 402 has been completed, input NAND gate 662 may be rendered operative by a regulating signal from the associated input circuit 700 and regulator circuit 363.

The sequential operation is caused by the fact that NAND gate 660 is the only NAND gate of this series in firing circuits 44A that is providing an output signal to the input NAND gate of the succeeding firing circuit, i.e. NAND gate 640 of firing circuit 443A. Thus, the change in signals in conductor 626 is ineffective to cause any change in the operation of any firing circuit except firing circuit 443A. The operation of firing circuit 443A to provide a firing signal to the gate terminal of controlled rectifier 403 will prepare, in a similar manner, firing circuit 444A to fire controlled rectifier 404.

Further, at the point in the sequence of operation of firing circuits 44A when firing circuit 445A is fully prepared to fire controlled rectifier 405, that circuit is rendered operative by a signal from input circuit 700 and regulator circuit 385 in the following manner. When the phase B to phase C line to line voltage becomes less than the regulating signal 300, a signal appears in the inverted output of regulator circuit 385. This signal, along with the signal from enabling conductor 110 causes an output signal to issue from AND gate 708 to NOR gate 714 to remove the output of that element. This causes NAND gate 716 to issue a signal to input NAND gate 640 of firing circuit 445A to operate that circuit and fire controlled rectifier 405.

Should a communication notch appear in conductor 616 of timing circuit 600 during the time period of multi-vibrator 612, it will remove the output signal of NAND gate 618 to NAND gate 620 and cause an output signal to issue from NAND gate 620 to remove the output signal on conductor 626. The removal of the output signal on conductor 626 removes one of the input signals to the input NAND gates of each of the firing circuits 44A and prevents further operation of any of the firing circuits.

However, it may be noted that for a notch to appear in conductor 616, the controlled rectifier, such as controlled rectifier 402 must have been rendered conductive so as to short the line to line voltage to another controlled rectifier. As this rectifier has been rendered conductive the firing signal to it may be removed with impunity. Thus the firing signal provided by the firing circuits, as for example firing circuit 442A, is generated only long enough to insure that controlled rectifier 402 is conducting. This will generally be a lesser time interval than a .23 millisecond provided by multi-vibrator 612 and hence, during advanced firing angles of the controlled rectifiers, where problems of shoot through are not as troublesome, the firing signals to the controlled rectifiers may be of a reduced time span. When the signal in conductor 626 is removed, an output signal from output NAND gate 648 is supplied to NAND gate 652. This removes the output signal from that gate to conductors 608 and to timing circuit 600. When the removed output signal in conductor 608 is supplied to timing circuit 600, it is supplied to NAND gate 606 to cause an output signal to issue from that NAND gate to NAND gate 602. This does not change the output signal of NAND gate 602 to the remainder of the timing circuit 600. Assuming the commutation notch occurs prior to the time multi-vibrator 612 again supplies an output signal, when multi-vibrator 612 does supply an output signal, this signal will be delivered to NAND gates 602 and 614. As all the inputs to NAND gate 602 receive an input signal, the output signal therefrom is removed. This removes an input signal of NAND gate 606 and insures that a signal will continue to issue from the output of that gate. Further, the removed out-time multi-vibrator 612 again supplies a signal to NAND gate 614 to cause that gate to issue an output signal to NAND gate 620.

The removed output signal from NAND gate 602 is supplied to NAND gate 624 which causes that element to issue an output signal to NAND gate 620. As the output signal from NAND gate 614 is also supplied to NAND gate 620, assuming the notch caused by commutation has disappeared, all of the inputs to NAND gate 620 will receive a signal and the output signal therefrom will be removed. This allows a signal to reappear in conductor 626 to operate the firing circuits and also lock up NAND gate 624.

If the commutation notch has not disappeared by the time multi-vibrator 612 again supplies a signal to NAND gates 602 and 614, one of the inputs to NAND gate 620 will lack an input signal and no change in the signal in conductor 626 will occur until the commutation notch disappears.

In this manner, the maximum rate of sequential operation of the firing circuits 44A is controlled by timing circuit 600 to prevent faulty operation of control circuit 20. The interval between the operation of one firing circuit and the subsequent firing circuit can be no less than the time delay of multi-vibrator 612 of timing 600. In addition, the operation of the subsequent firing circuit will be delayed until all commutation notches appearing in the alternate current supply lines have in fact disappeared.

The operation of residual circuit 362 in connection with firing circuit 442A is similar to its operation in connection with firing circuit 442. That is, in the event that an input signal is not supplied to input NAND gate 640 prior to 15 electrical degrees before the end of the conductive period of rectifier 402, residual circuit 362 will remove one of the inputs to NAND gate 68 at that time. This operates NAND gate 68, NAND gate 66, and the remaining portions of firing circuit 442A to generate a firing signal to the gate terminal of controlled rectifier 402 to fire the rectifier.

If it is desired to reverse the polarity of the direct current circulating in direct current buses 24 and 26, enabling circuit 32 is operated to remove the signal from conductor 110 and to supply a signal to conductor 112. This permits NAND gate 75 to be operated when the appropriate firing signal is generated in firing circuit 442A. NAND gate 75 operates inverting amplifier 77 to supply a firing signal to controlled rectifier 425 in rectifier bridge 42. The operation of firing circuit 442A in the generation of this firing signal is identical to that described above in connection with the generation of a firing signal to controlled rectifier 402.

It will be readily apparent that numerous modifications and alterations may be made in the above described embodiments of the invention without departing from the spirit of the invention. For example, other types of logic elements and circuit components may be used in place of those described above. It is intended to cover in the appended claims all such modifications and alterations as fall within the true spirit and scope of the invention.

I claim:
1. An electrical control circuit for converting polyphase alternating current existing in alternating current supply lines to an adjustable magnitude direct current by controlling the operation of a plurality of controlled rectifiers connected in a rectifier bridge, said bridge having an input connected to said supply lines and an output providing said adjustable magnitude direct current, said control circuit comprising:
   a plurality of firing circuits connected to said plurality of controlled rectifiers for supplying firing signals to said controlled rectifiers, each firing circuit rendering an oncoming controlled rectifier and a preceding controlled rectifier associated therewith conductive;
   permit to fire circuits connected to said firing circuits to operate said firing circuits to permit each of said firing circuits to supply firing signals to its associated controlled rectifiers after a first point in time during the conductive interval of the rectifiers;
   regulator circuit means connected to said firing circuit to operate said firing circuits to supply firing signals to the associated controlled rectifiers subsequent to said first point in time to response to a regulating signal, thereby to provide an adjustable magnitude direct current in accordance with said regulating signal; and
   residual circuits connected to said firing circuits to operate said firing circuits to force each of said firing circuits to supply firing signals to the associated controlled rectifiers after a time subsequent to said first time in the event the regulator circuit means does not previously operate said firing circuits to supply firing signals.

2. The electrical control circuit of claim 1 for converting poly-phase alternating current to an adjustable magnitude direct current of either polarity by controlling the operation of a plurality of controlled rectifiers connected in a pair of oppositely poled rectifier bridges and including an enabling circuit operated by said regulating signal and operatively associated with said firing circuits to cause said firing circuits to render either the controlled rectifiers of one of said rectifier bridges conductive or the controlled rectifiers of the other rectifier bridge conductive.

3. The electrical control circuit of claim 1 wherein said adjustable magnitude direct current is provided to a pair of direct current buses and each one of the plurality of controlled rectifiers in said rectifier bridge is connected between an alternating current supply line containing a phase of alternating current and one of said direct current buses and wherein said permit to fire circuits comprise crossing detectors operated by alternating current line voltage signals existing in said alternating current supply lines.

4. The electrical control circuit of claim 3 wherein the permit to fire circuit connected to any given firing circuit is operated by a line to neutral voltage signal corresponding to the alternating current phase preceding the phase in which the oncoming controlled rectifier associated with said firing circuit is connected.

5. The electrical control circuit of claim 4 wherein the permit to fire circuit permits the firing circuit connected thereto to supply a firing signal to the associated controlled rectifiers after the alternating current phase preceding the phase in which the oncoming controlled rectifier associated with firing circuit is connected reverses its polarity with respect to neutral.

6. The electrical control circuit of claim 1 wherein said adjustable magnitude direct current is provided to a pair of direct current buses and each one of the plurality of controlled rectifiers in said rectifier bridge is connected between an alternating current supply line containing a phase of alternating current and one of said direct current buses and wherein said residual circuits comprise crossing detectors operated by alternating current line voltage signals existing in said alternating current supply lines.

7. The electrical control circuit of claim 6 wherein the residual circuit connected to any given firing circuit is operated by an alternating current line to neutral voltage signal corresponding to the alternating current phase in which the oncoming controlled rectifier associated with the firing circuit is connected.

8. The electrical control circuit of claim 7 wherein said residual circuit forces the firing circuit connected thereto to supply a firing signal to the associated controlled rectifiers after the alternating current line to neutral voltage signal corresponding to the alternating current phase in which the oncoming controlled rectifier is connected reverses polarity with respect to neutral.

9. The electrical control circuit of claim 1 wherein said adjustable magnitude direct current is provided to a pair of direct current buses and each one of the plurality of controlled rectifiers in said rectifier bridge is connected between an alternating current supply line containing a phase of alternating current and one of said direct current buses and wherein said regulator circuit means include crossing detectors operated by alternating current line to line voltage signals existing in said alternating current supply lines.

10. The electrical control circuit of claim 9 wherein said adjustable magnitude direct current is provided to a pair of direct current buses and each one of the plurality of controlled rectifiers in said rectifier bridge is located between an alternating current supply line containing a phase of alternating current and one of said direct current buses and wherein the regulator circuit means connected to any given firing circuit is operated by the line to line voltage signal between the line containing the phase in which the oncoming controlled rectifier associated with the firing circuit is connected and the line containing the subsequent phase of alternating current.

11. The eyectrical control circuit of claim 10 wherein a regulator circuit means operates the given firing circuit connected thereto to supply a firing signal to the associated controlled recifiers when the regulating signal reverses polarity with respect to the line to line voltage between the line containing the phase in which the oncoming controlled rectifier associated with the firing circuit is located and the line containing the subsequent phase of alternating current.

12. The electrical control circuit of claim 1 wherein each of said firing circuits includes a plurality of logic elements receiving input signals from a permit to fire circuit, a regulator circuit means, and a residual circuit, said plurality of logic elements providing a changed output signal in response to said input signals, said plurality of logic elements connected to a means for generating a firing signal to the associated controlled rectifiers for providing a firing signal in response to a change in the output signal from said plurality of logic elements.

13. The electrical control circuit of claim 12 wherein said plurality of logic elements comprise a plurality of NAND gates.

14. The electrical control circuit of claim 13 wherein each of said firing circuits includes a pair of NAND gates receiving input signals from a permit to fire circuit and a residual circuit, said NAND gates having the inputs and outputs interconnected and providing an output signal in response to said input signals, said pair of NAND gates connected to a means for generating a firing signal to the associated controlled rectifiers for providing a firing signal in response to a change in the output signal from said pair of NAND gates.

15. The electrical control circuit of claim 14 wherein said pair of NAND gates also receives an input signal from a regulator circuit means.

16. The electrical control circuit of claim 12 wherein said means for generating a firing signal includes a multi-vibrator operable by the output signal of said plurality of logic elements.

17. The electrical control circuit of claim 14 including an input NAND gate connected to said pair of NAND gates, wherein the signals from said permit to fire circuit and said reisdual circuit are supplied to the input NAND gate and the output signal of said input NAND gate is supplied to said pair of NAND gates.

18. The electrical control circuit of claim 16 wherein said multi-vibrator provides a changed output signal in its output for a given period of time in response to a change in the output signal from said plurality of logic elements thereby to operate said means for generating a firing signal for that time period.

19. A firing circuit for providing firing signals to an associated oncoming controlled rectifier during its conductive interval and to a preceding controlled rectifier, all in accordance with a first input signal permitting said circuit to supply firing signals after a first time during the conductive interval of the oncoming rectifier, a second input signal operating said circuit to supply firing signals subsequent to said first time, and a third input signal operating said firing circuit to force said firing circuit to supply firing signals in the event said second signal does note prevously operate said circuit, said circuit including:
    a plurality of logic elements operable by said input signals and having the inputs and outputs thereof interconnected, and providing a changed output signal in response to said input signals;
    a multi-vibrator operated by the output signal of said plurality of logic elements and connected to a means for generating a firing signal to the gate terminals of the associated controlled rectifiers for providing a firing signal in response to a change in the output signal of said plurality of logic elements.

20. The firing circuit of claim 19 wherein said plurality of logic elements include a pair of NAND gates.

21. The firing circuit of claim 20 including an input NAND gate connected to said pair of NAND gates and wherein said first input signal and said second input signal are supplied to the input NAND gate and the output signal of said input NAND gate is supplied to said pair of NAND gates.

22. The firing circuit of claim 19 wherein said multi-vibrator provides a changed output signal for a given time period in response to a change in the output signal from said plurality of logic elements thereby to operate said means for generating a firing signal for that time period.

23. The electrical control circuit of claim 12 wherein said firing circuits sequentially fire their respective associated controlled rectifiers and wherein said control circuit includes means interconnecting said firing circuits to operate them in the proper sequence.

24. The electrical control circuit of claim 23 wherein said means for generating a firing signal includes a multi-vibrator operable by the output signal of said plurality of logic elements and wherein said means interconnecting said firing circuits includes a logic element receiving an input signal from said multi-vibrator and from the multi-vibrator of the firing circuit preceding the firing circuit in sequence.

25. The electrical control circuit of claim 23 wherein said means interconnecting said firing circuits includes a timing circuit, operable by the output signals of said plurality of logic elements of each of said firing circuits, and providing an output signal to said firing circuits to permit them to operate in accordance with said timing circuit, said interconnecting means also including logic means interconnecting said firing circuits to operate them only in the proper sequence.

26. The electrical control circuit of claim 25 wherein each of said firing circuits includes an input logic element operable by input signals from a regulator circuit means and from said timing circuit and providing an output signal to said plurality of logic elements and, a blocking logic element means operable by the signal from said timing circuit to provide a signal to said means for generating a firing signal to terminate said firing signal generated in response to a change in the octput signal of said plurality of logic elements and to provide a signal to the immediately successive firing circuit to render that firing circuit operable at the termination of the firing signal, thereby to cause said firing circuits to operate in the proper sequence.

27. A firing circuit for providing firing signals to an associated oncoming controlled rectifier during its conductive interval and a preceding controlled rectifier, all in accordance with a first input signal permitting said circuit to supply firing signals after a first time during the conductive interval of the oncoming controlled rectifier, a second input signal operating said circuit to supply firing signals subsequent to said first time a third input signal operating said firing circuit to force said firing circuit to supply firing signals in the event said second signal does not previously operate said circuit, and a fourth input signal, said fourth input signal being responsive to the generation of firing signals by said firing circuit, said firing circuit being adapted for use in a sequentially operated series of firing circuits and comprising:
    an input logic element operable by said second input signal and said fourth input signal and providing an output signal;
    a pair of logic elements operable by the output signal of said input logic element, said first input signal, and said third input signal and having the inputs and outputs thereof interconnected, and providing a changed output signal in response to said signals;
    means for generating a firing signal to the associated rectifiers for providing a firing signal in response to a change in the output signal from said pair of logic elements; and
    a blocking logic element means operable by said fourth signal to provide a signal to said means for generating a firing signal to terminate the firing signal generated in response to the changed output signal of said plurality of logic elements and to provide a signal to an immediately successive firing circuit to render that firing circuit operable at the termination of said firing signal.

28. The firing circuit of claim 27 wherein said logic elements are NAND gates.

29. The firing circuit of claim 27 wherein said input logic element is also operable by the signal from the blocking logic element means of an immediately preceding firing circuit.

30. The firing circuit of claim 27 wherein said pair of logic elements provides an output signal to a blocking logic element means of an immediately preceding firing circuit to prevent that firing circuit from becoming operative when the present firing circuit is operative.

31. The electrical control circuit of claim 25 wherein said timing circuit includes a means responsive to the output signals of said plurality of logic elements of each of said firing circuits to provide a changed output signal for a time period in response to a changed output signal from one or more of said pluralities of logic elements, said timing circuit also having an input signal from said alternating current supply lines for providing signals indicating commutation notches in said poly-phase alternating current supply lines, said timing circuit providing an output signal to said firing circuit after either said time period or the passage of said commutation notches.

32. The electrical control circuit of claim 31 wherein said timing circuit includes a means to reset said means responsive to the output signal of said plurality of logic elements to provide for subsequent operation thereof.

33. The electrical control circuit of claim 12 for converting poly-phase alternating current to an adjustable magnitude direct current of either polarity by controlling the operation of a plurality of controlled rectifiers connected in a pair of oppositely poled rectifier bridges and operable by said firing circuits and including an enabling circuit operated by said regulating signal and operatively associated with said firing circuits to cause said firing circuits to render either the controlled rectifiers of one of said rectifier bridges conductive or the controlled rectifiers of the other rectifier bridge conductive.

34. The electrical control circuit of claim 33 wherein said enabling circuit is operatively associated with the means for generating a firing signal to control the provision of firing signals to the controlled rectifiers.

35. The electrical control circuit of claim 33 wherein said means for generating a firing signal is associated with the controlled rectifiers in both bridges, said enabling circuit is operatively connected to said means for generating a firing signal and said regulator circuit means to provide firing signals to the associated controlled rectifiers in one or the other of the rectifier bridges.

36. The electrical control circuit of claim 34 wherein said means for generating a firing signal is associated with the controlled rectifiers in one bridge and said enabling circuit controls the provision of firing signals by said means to the controlled rectifiers in that bridge.

37. The electrical control circuit of claim 2 wherein said enabling circuit includes means operable by the polarity of said regulating signal and by a current signal indicating the flow of said poly-phase alternating current to said controlled rectifiers, said means being operatively associated with said firing circuits to cause said firing circuits to render either the controlled rectifiers of one of said rectifier bridges conductive or the controlled rectifiers of the other rectifier bridge conductive in accordance with the polarity of the regulating signal and for switching between the bridges only when said current signal indicates curent is not flowing.

38. The electrical control circuit of claim 37 wherein said enabling circuit includes a delay means responsive to said current signal, said delay means being operable to cause said circuit means to switch between said rectifier bridges when said current signal indicates that current flow has ceased for the period of the delay by said means.

39. The electrical control circuit of claim 37 wherein said enabling circuit includes a coincidence circuit operable by said reference signal, by a signal indicating which bridge is conducting, and by said current signal for ascertaining when the conducting rectifier bridge coincides with the polarity of the reference signal and for preparing the enabling circuit to switch between the bridges when the current signal indicates current is not flowing.

40. The electrical control circuit of claim 38 wherein said enabling circuit includes a coincidence circuit operable by said reference signal, by a signal indicating which bridge is conducting, and by said current signal for ascertaining when the conducting rectifier bridge coincides with the polarity of the reference signal, for preparing the enabling circuit to switch between the bridges when the current signal indicates current is not flowing and for permitting the switching between rectifier bridges when said current signal indicates that current flow has ceased for the period of the delay of said delay means.

41. The electrical control circuit of claim 37 wherein said enabling circuit includes an output circuit for providing signals to said firing circuits to render the controlled rectifiers of one or the other of said rectifier bridges conductive.

42. The electrical control circuit of claim 41 wherein said output circuit includes a flip-flop circuit.

43. The electrical control circuit of claim 40 wherein said enabling circuit includes an output circuit operable by said delay circuit and by said coincidence means to switch between rectifier bridges when the polarity of the reference signal has reversed and said current signal indicates that current flow has ceased for the period of the delay of said delay means.

44. The electrical control circuit of claim 38 wherein said enabling circuit includes a reset circuit for said delay means to reset said delay means for subsequent operation.

45. The electrical control circuit of claim 8 wherein said residual circuits are connected to said firing circuits through a delay circuit to force the firing circuit to supply a firing signal to the associated control rectifiers after the alternating current line to neutral voltage signal corresponding to the alternating current phase in which the oncoming control rectifier is connected reverses polarity with respect to neutral.

46. The electrical control circuit of claim 8 wherein said residual circuits are connected to said firing circuits through a common delay circuit to force the firing circuits connected thereto to supply firing signals to the associated control rectifiers after the alternating current line to neutral voltage signal corresponding to the alternating current phase in which the oncoming controlled rectifier associated with any given firing circuit is connected reverses polarity with respect to neutral.

47. The electrical control circuit of claim 1 wherein said permit to fire circuits, and said residual circuits are combined in common circuit elements which provide signals to said firing circuits in response to alternating current line voltage signals existing in said alternating current supply lines.

48. A circuit means for use in conjunction with an electrical control circuit containing firing circuits controlling, in response to a bi polarity regulating signal, the operation of a plurality of controlled rectifiers connected in a pair of oppositely poled rectifier bridges, said electrical control circuit converting poly-phase alternating current to an adjustable magnitude direct current of either polarity, said circuit means including: means operable by the polarity of said regulating signal and by a current signal indicating the flow of said poly-phase alternating current through said controlled rectifiers, said means being operatively associated with said firing circuits to cause said firing circuits to render either the controlled rectifiers of one of said rectifier bridges conductive or the controlled rectifiers of the other rectifier bridge conductive in accordance with the polarity of the regulating signal and for switching between the bridges only when said current signal indicates current is not flowing.

49. The circuit means of claim 48 including a delay means responsive to said current signal, said delay means being operable to cause said circuit means to switch between said rectifier bridges when said current signal indicates that current flow has ceased for a period of the delay of said delay means.

50. The circuit means of claim 48 including a coincidence circuit operable by said reference signal, by a signal indicating which bridge is conducting, and by said current signal for ascertaining when the conducting rectifier bridge coincides with the polarity of the reference signal and for preparing the enabling circuit to switch between the bridges when the current signal indicates current is not flowing.

51. The circuit means of claim 49 including a coincidence circuit operable by said reference signal, by signal indicating which bridge is conducting, and by said current signal, for ascertaining when the conducting rectifier bridge coincides with the polarity of the reference signal for preparing the circuit means to switch between the bridges when the current signal indicates current is not flowing and for permitting the switching between rectifier bridges when the current signal indicates that current flow has ceased for the period of the delay of said delay means.

52. The circuit means of claim 51 including an output circuit operable by the said delay means and by said coincidence circuit to switch between rectifier bridges when the polarity of the reference signal has reversed and said current signal indicates that the current flow has ceased for the period of the delay of said delay means.

53. The circuit means of claim 49 including a reset circuit operatively connected to said delay means to reset said delay means for subsequent operation.

54. The electrical control circuit of claim 12 wherein said means for generating a firing signal includes a means to eliminate noise to the firing circuits from the associated controlled rectifier.

55. An electrical control circuit for converting polyphase alternating current existing in alternating current supply lines to an adjustable magnitude direct current by controlling the operation of a plurality of controlled rectifiers connected in a rectifier bridge, said bridge having an input connected to said supply lines and an output providing said adjustable magnitude direct current, said control circuit comprising:

a plurality of firing circuits connected to said plurality of controlled rectifiers for supplying firing signals to said controlled rectifier, each firing circuit rendering one or more controlled rectifiers associated therewith conductive;

regulator circuit means connected to said firing circuit to operate said firing circuit to supply a firing signal to said rectifiers during their conductive interval in response to a regulating signal, thereby to provide an adjustable magnitude direct current in accordance with said regulating signal; and residual circuits connected to said firing circuits to operate said firing circuits to force each of said firing circuits to supply a firing signal to said controlled rectifiers in the event said regulator circuits means does not previously operate said firing circuits to supply a firing signal.

56. An electrical control circuit for converting polyphase alternating current existing in alternating current supply lines to an adjustable magnitude direct current by controlling the operation of a plurality of controlled rectifiers connected in a rectifier bridge, said control circuit including a plurality of firing circuits for providing firing signals to an associated oncoming one of said controlled rectifiers and an associated preceding one of said controlled rectifiers, said control circuit providing such conversion in accordance with a regulating signal operating said firing circuits to provide firing signals to said associated controlled rectifiers and a second input signal forcing said firing circuits to provide firing signals in the event said regulating signal does not previously operate said circuits, each of said firing circuits including:

a plurality of logic elements operable by either said regulating signal or said second signal and providing a changed output signal in response thereto; and means for generating a firing signal to the associated controlled rectifiers in response to a change in the output signal from said plurality of logic elements.

57. The electrical control of claim 56 wherein said plurality of logic elements comprise NAND gates.

References Cited

UNITED STATES PATENTS 3,281,645 10/1966 Spink _____ 321—47
3,329,883 7/1967 Frierdich _____ 321—5
3,351,838 11/1967 Hunter _____ 321—11 X LEE T. HIX, *Primary Examiner.*

W. H. BEHA, *Assistant Examiner.*